United States Patent
Kroll et al.

(10) Patent No.: US 12,352,613 B2
(45) Date of Patent: Jul. 8, 2025

(54) DUAL PLATFORM WEIGHING SCALE TECHNOLOGY

(71) Applicant: Intercomp Company, Medina, MN (US)

(72) Inventors: William P Kroll, Medina, MN (US); Randie Evenson, Blaine, MN (US)

(73) Assignee: Intercomp Company, Medina, MN (US)

( * ) Notice: Subject to any disclaimer, the term of this patent is extended or adjusted under 35 U.S.C. 154(b) by 388 days.

(21) Appl. No.: 17/900,788

(22) Filed: Aug. 31, 2022

(65) Prior Publication Data

US 2023/0204405 A1 Jun. 29, 2023

Related U.S. Application Data

(60) Provisional application No. 63/239,265, filed on Aug. 31, 2021.

(51) Int. Cl.
*G01G 19/02* (2006.01)

(52) U.S. Cl.
CPC .................. *G01G 19/027* (2013.01)

(58) Field of Classification Search
CPC ................... G01G 19/025; G01G 19/027
See application file for complete search history.

(56) References Cited

U.S. PATENT DOCUMENTS

| | | | | | |
|---|---|---|---|---|---|
| 2,269,969 | A | * | 1/1942 | Branick | G01G 19/025 177/208 |
| 3,966,002 | A | * | 6/1976 | Schneider | G01G 3/02 177/136 |
| 3,999,621 | A | * | 12/1976 | Wagner | G01G 21/23 177/133 |
| 4,203,497 | A | * | 5/1980 | Harris | G01G 19/025 177/244 |
| 4,258,814 | A | * | 3/1981 | Dillon | G01G 3/12 177/126 |
| 4,281,728 | A | * | 8/1981 | Dickason | G01G 19/027 177/211 |
| 4,979,581 | A | * | 12/1990 | Kroll | G01G 19/027 177/211 |
| 5,440,078 | A | * | 8/1995 | Schuler | G01G 19/027 177/229 |
| 5,894,112 | A | * | 4/1999 | Kroll | G01G 19/02 177/164 |
| 6,177,638 | B1 | * | 1/2001 | Murray | G01G 19/021 177/133 |

(Continued)

FOREIGN PATENT DOCUMENTS

CN 107687886 A * 2/2018

*Primary Examiner* — Natalie Huls
(74) *Attorney, Agent, or Firm* — Joel Skinner

(57) ABSTRACT

A dual platform, electronic weigh scale is disclosed. The scale is compact and self-contained. The scale is useful for commercial vehicle weight enforcement. The scale has a base, a set of load cells, and two (2) platforms. The base is rigid, metallic, and generally rectangular, and has a central recessed area. The load cells are elongated, rectangular, and are coupled to the base in the central recessed area. The set of load cells are arranged such that half are in communicative contact with one platform and the other half are in communicative contact with the other platform.

19 Claims, 27 Drawing Sheets

(56) References Cited

U.S. PATENT DOCUMENTS

| | | | | |
|---|---|---|---|---|
| 6,706,976 | B1* | 3/2004 | Schuler | G01G 19/02 |
| | | | | 177/126 |
| 7,423,225 | B1* | 9/2008 | Kroll | G01G 21/22 |
| | | | | 177/132 |
| D689,388 | S * | 9/2013 | Berme | D10/94 |
| 2005/0115745 | A1* | 6/2005 | Kroll | G01G 19/027 |
| | | | | 177/126 |
| 2011/0232973 | A1* | 9/2011 | Abercrombie | G01G 19/027 |
| | | | | 177/132 |
| 2011/0232974 | A1* | 9/2011 | Abercrombie | G01G 19/024 |
| | | | | 177/133 |
| 2012/0000715 | A1* | 1/2012 | Saigh | G01G 19/027 |
| | | | | 177/136 |
| 2013/0220708 | A1* | 8/2013 | Kim | G01G 23/3735 |
| | | | | 177/3 |
| 2016/0370248 | A1* | 12/2016 | Stefanov | A61G 5/10 |
| 2019/0346303 | A1* | 11/2019 | Kroll | G01G 21/23 |
| 2020/0386607 | A1* | 12/2020 | Pearson | G01G 19/414 |
| 2021/0102834 | A1* | 4/2021 | Kim | G01G 21/23 |

* cited by examiner

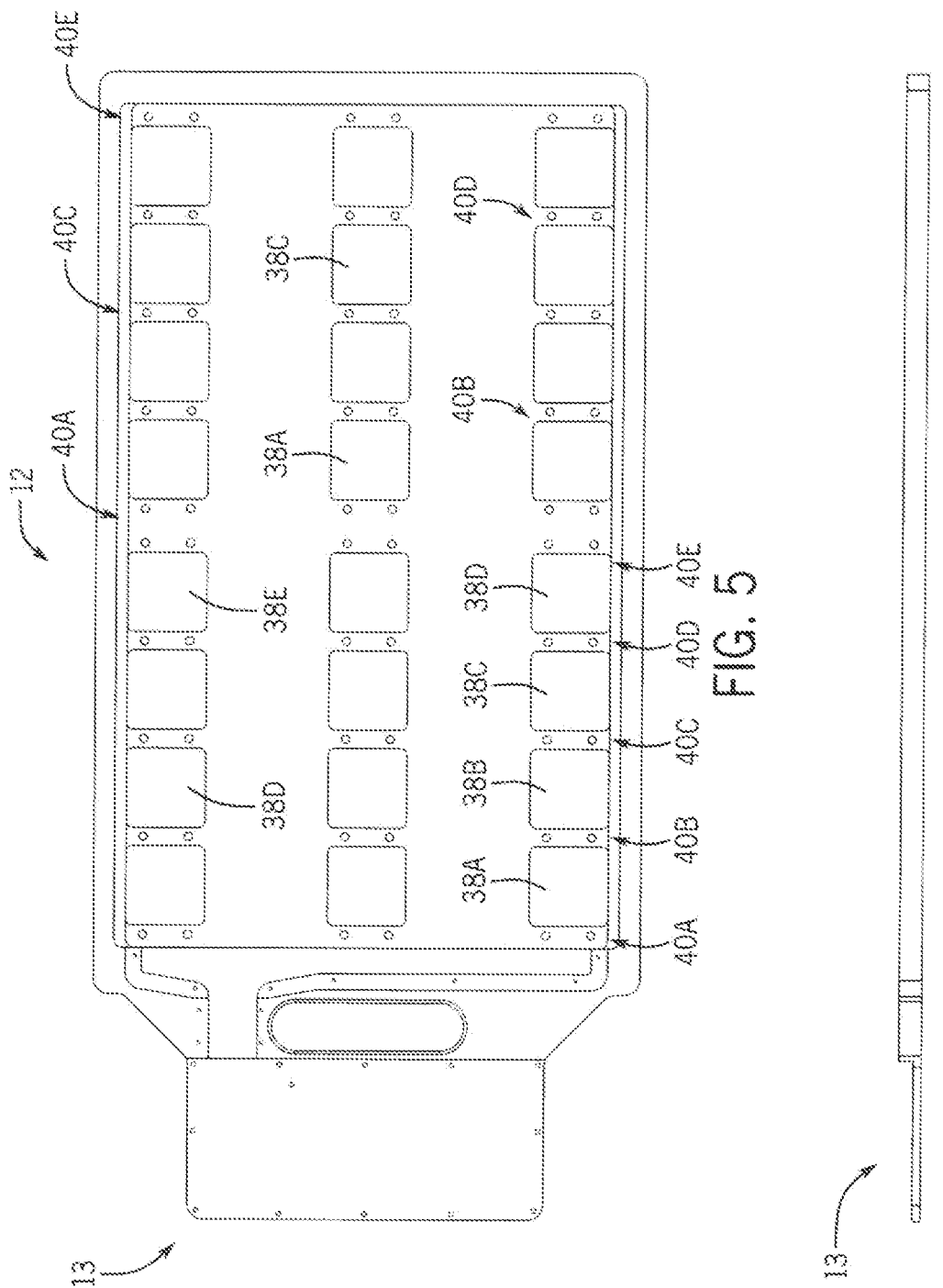

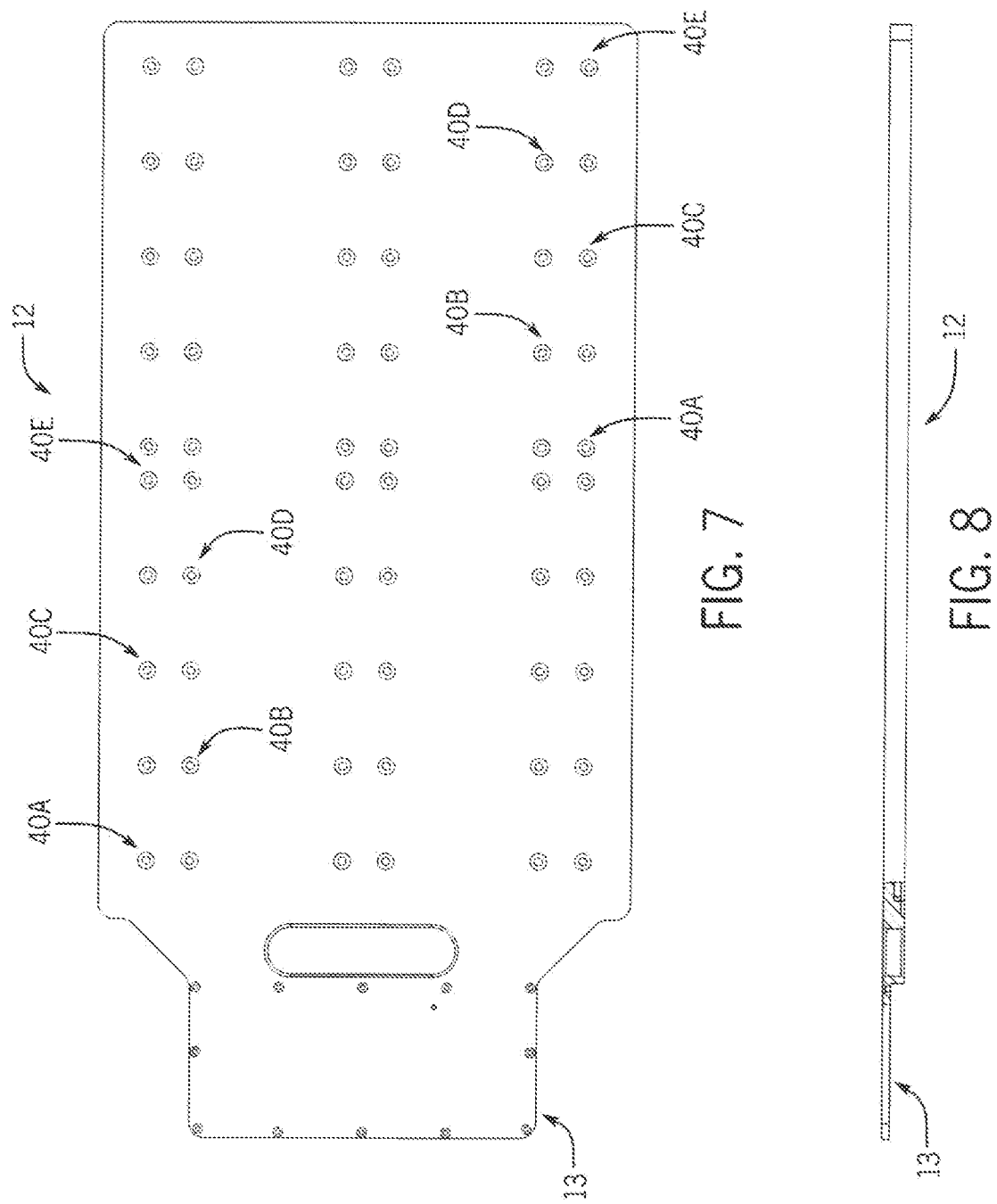

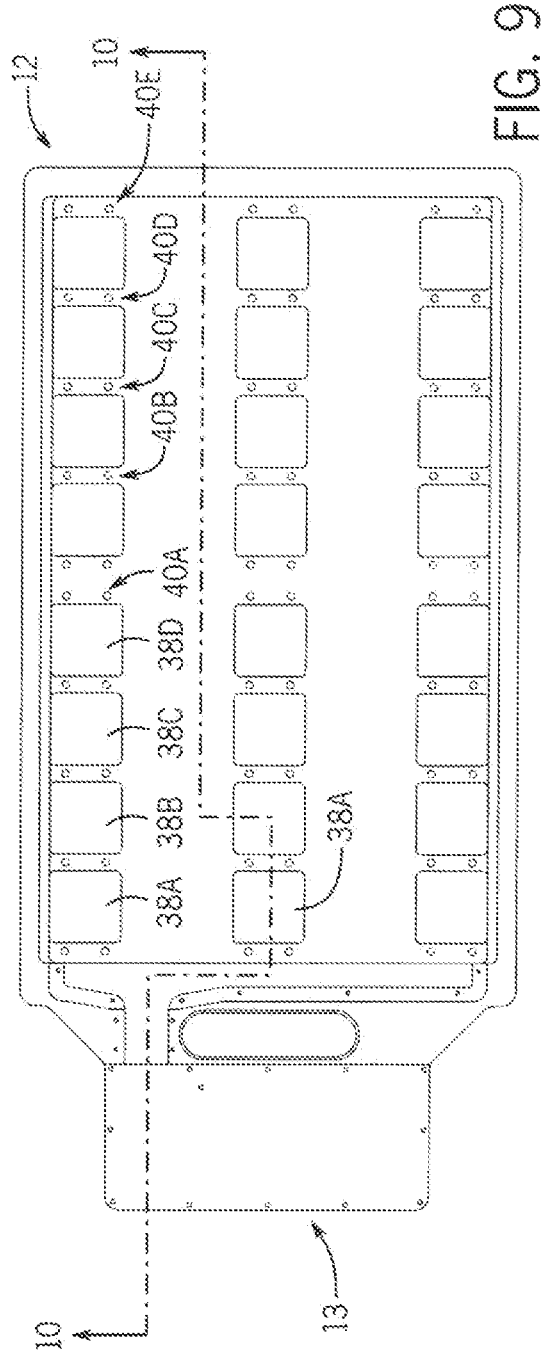
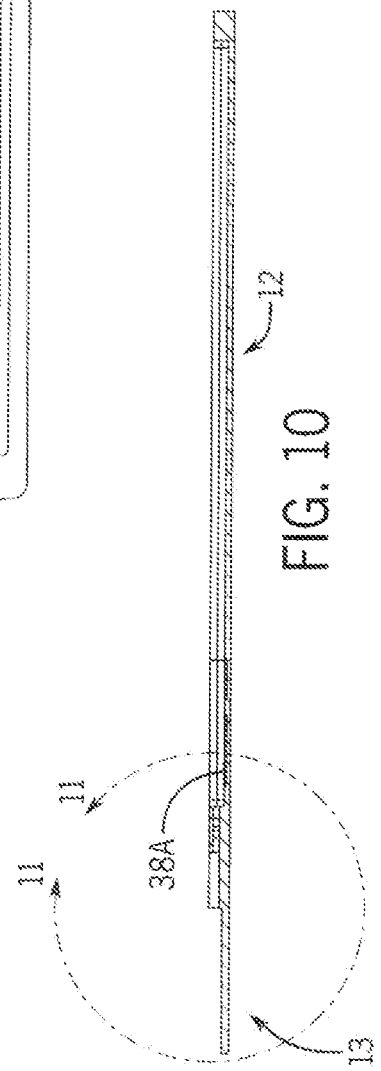
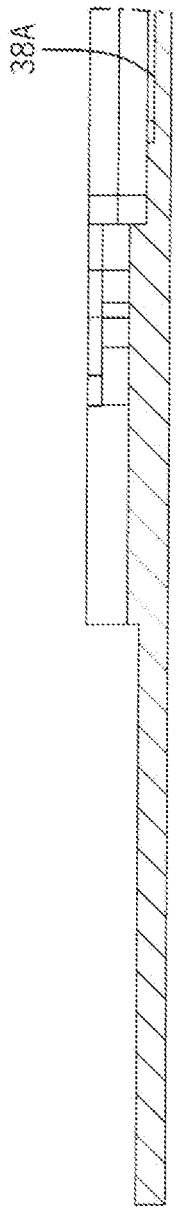
FIG. 9
FIG. 10
FIG. 11

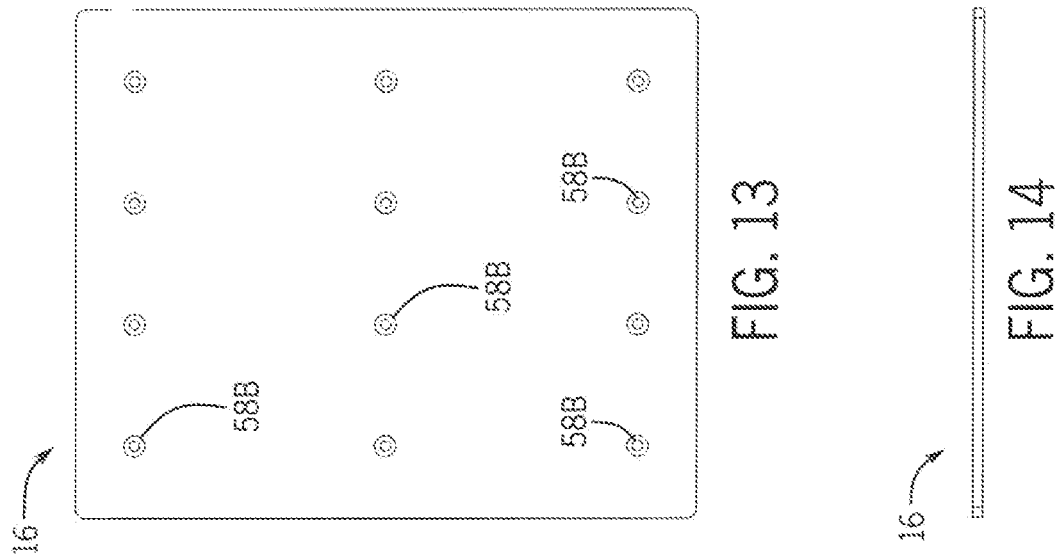
FIG. 13
FIG. 14
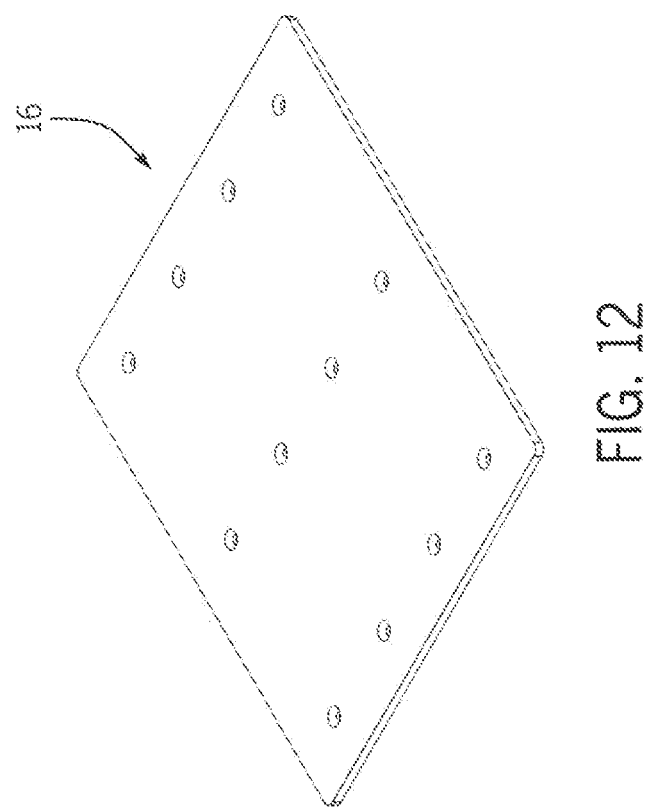
FIG. 12

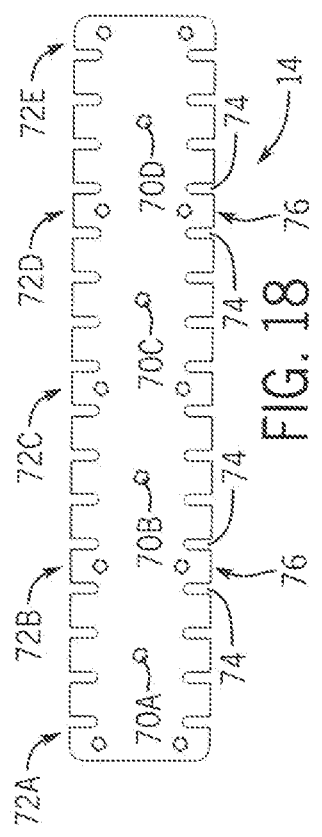
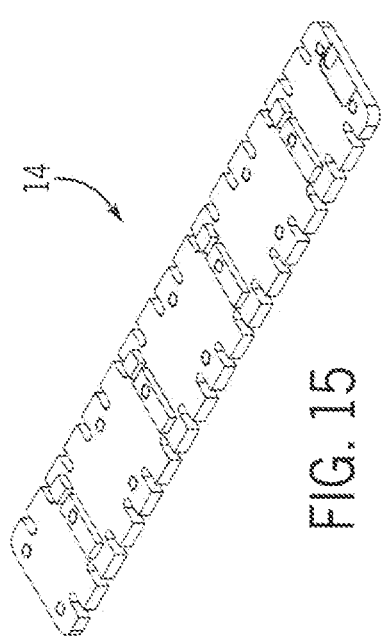
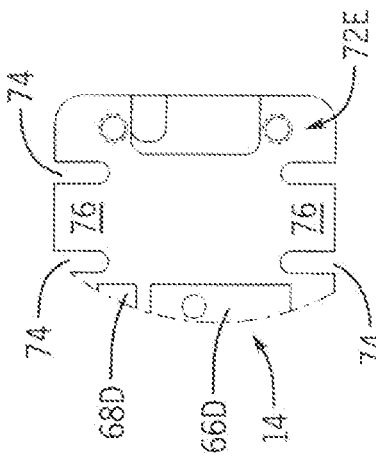
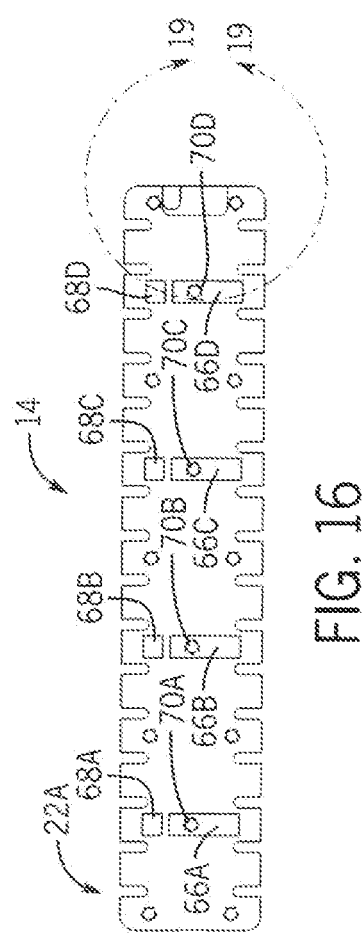
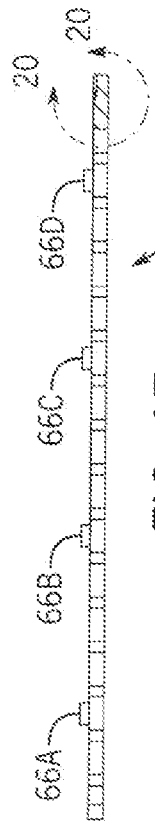

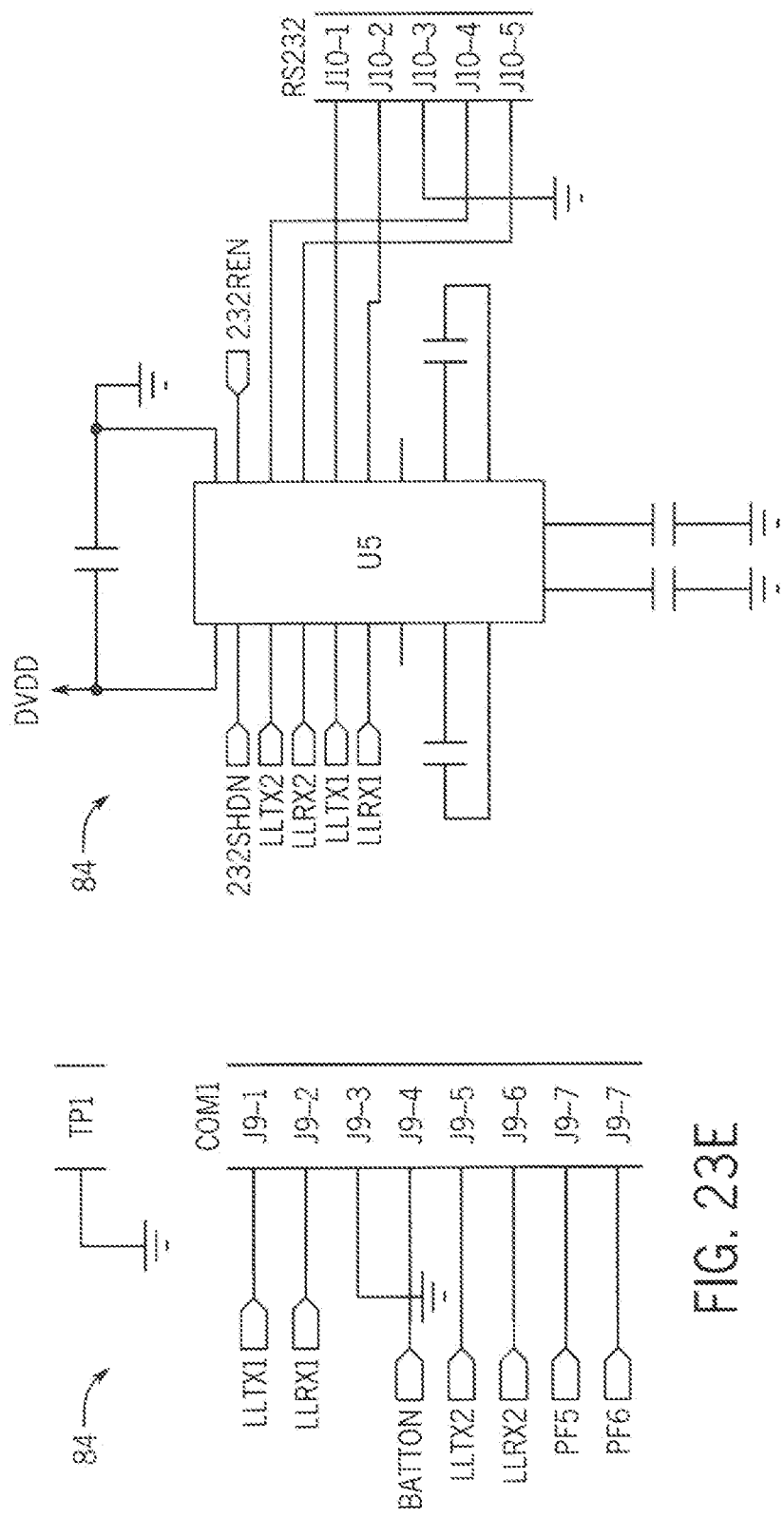

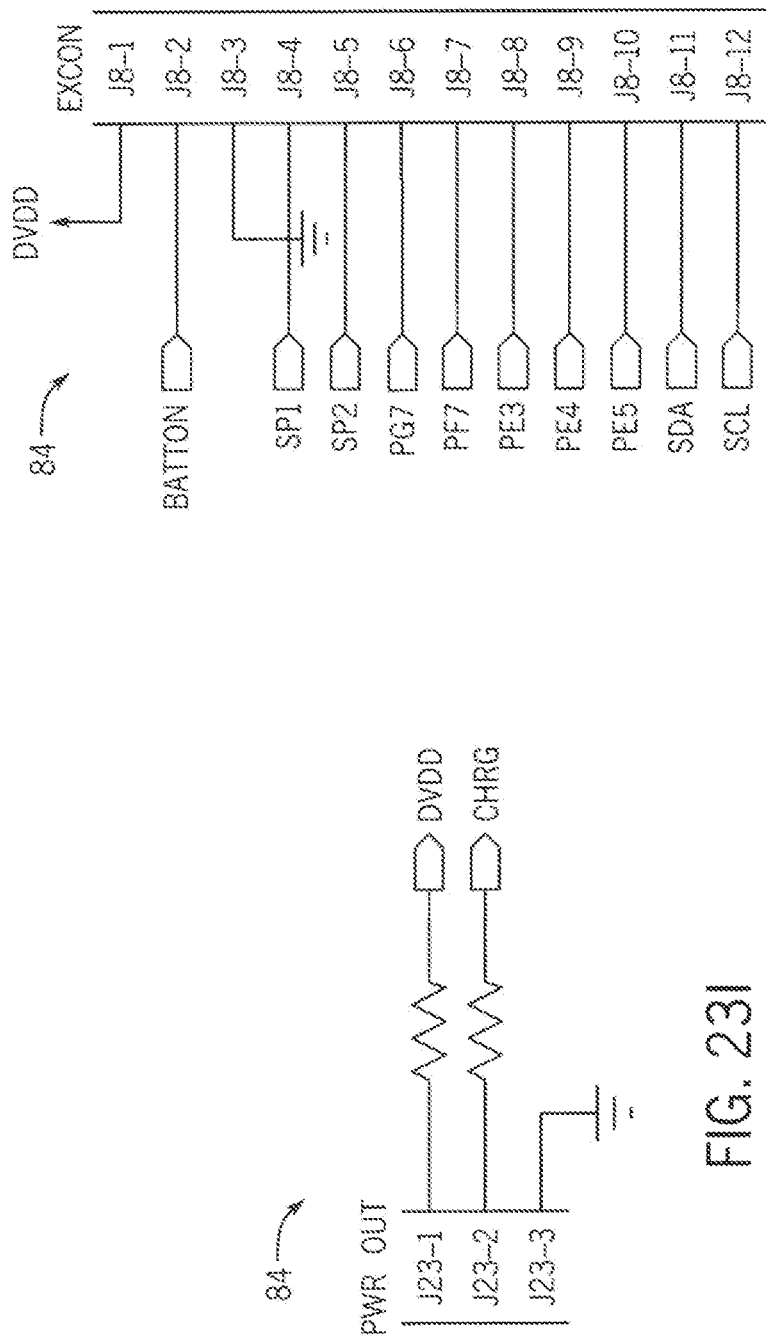

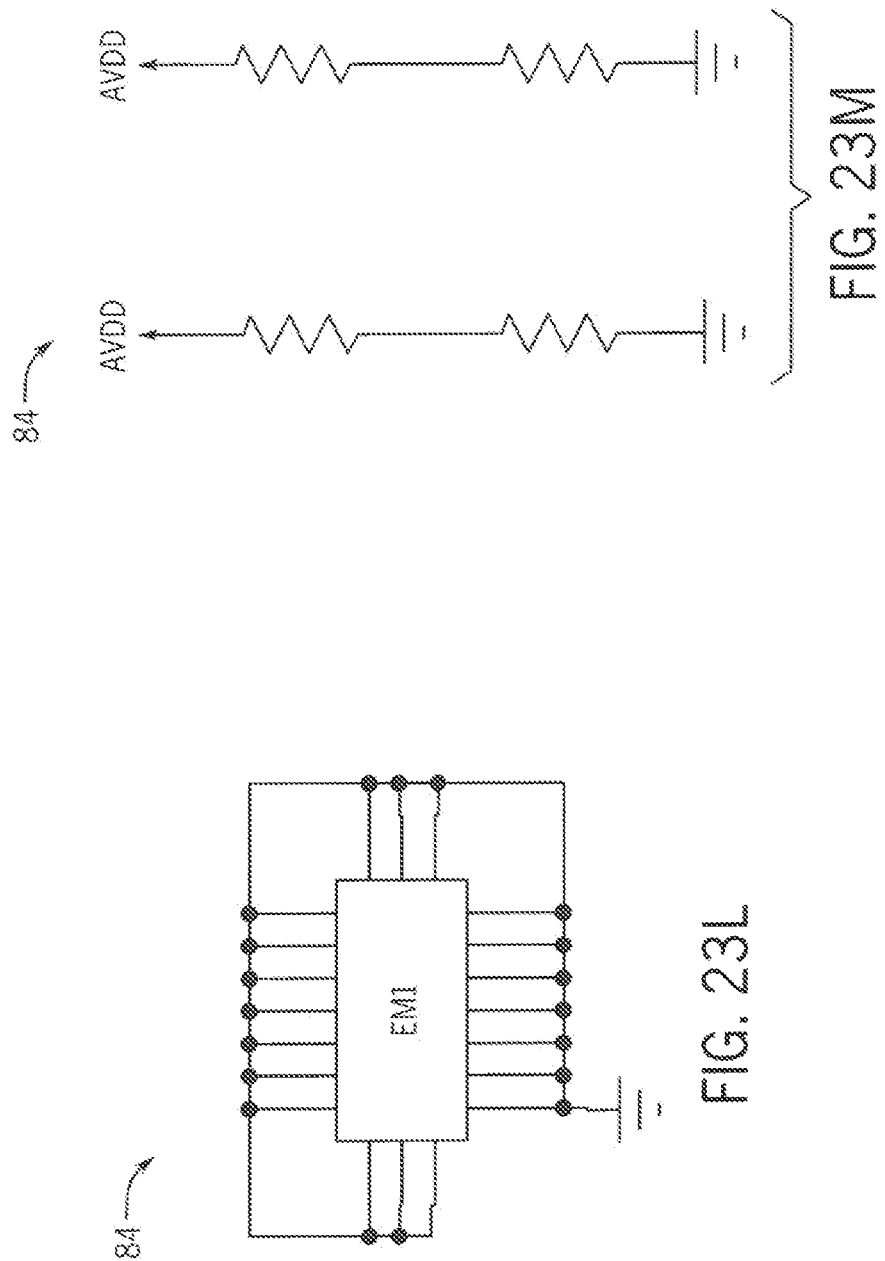

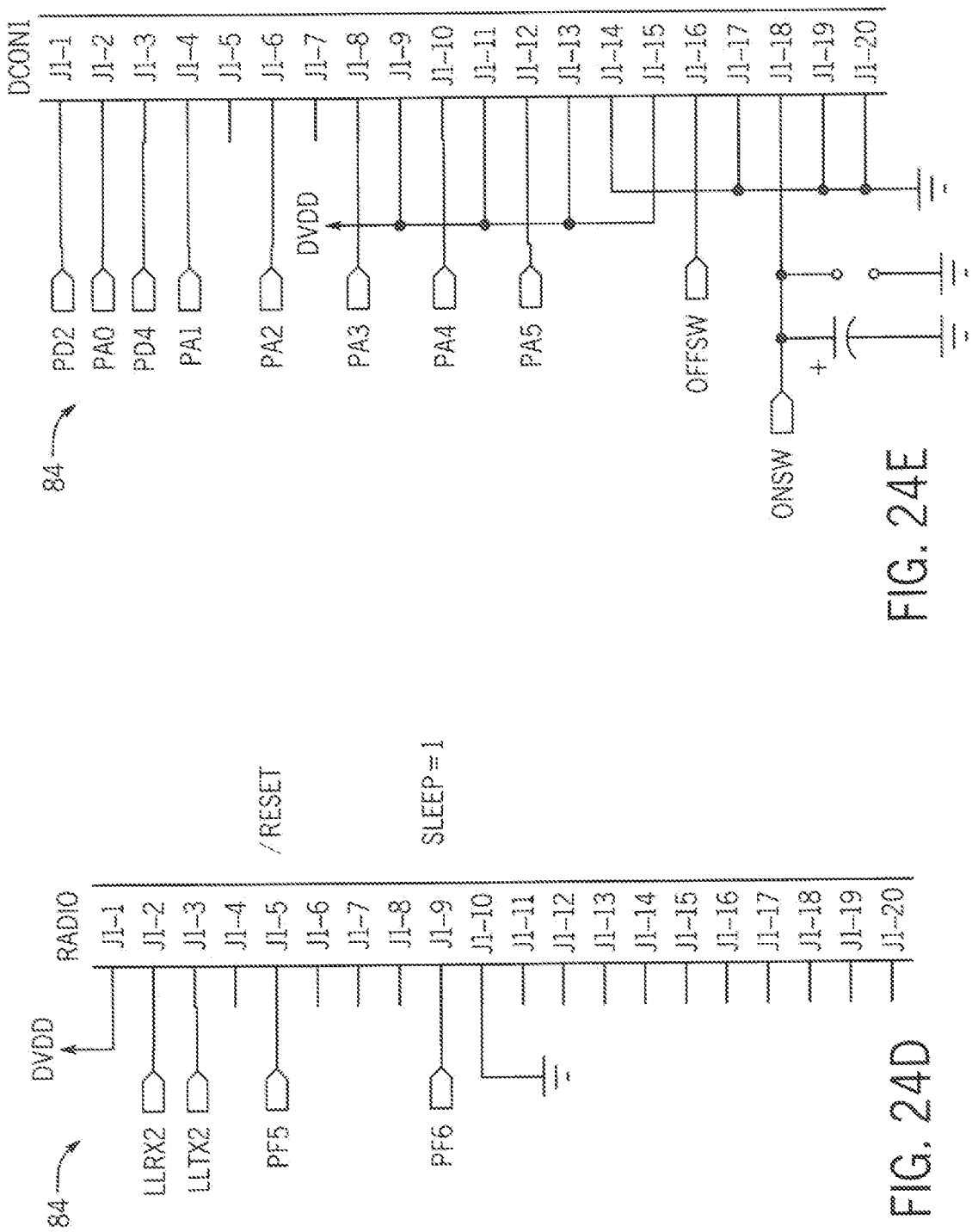

DUAL PLATFORM WEIGHING SCALE TECHNOLOGY

CROSS-REFERENCE TO RELATED APPLICATIONS, IF ANY

This application claims the benefit under 35 U.S.C. § 119(e) of U.S. Provisional Patent Application Ser. No. 63/239,265, filed Aug. 31, 2021, which is hereby incorporated by reference.

37 C.F.R. § 1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to weighing systems, apparatus and methods. Particularly, the invention relates to a low profile weigh scale. Most particularly, the invention relates to a compact, lightweight, portable, accurate, and easy to deploy vehicle wheel scale which utilizes dual weigh pads. The scale of the invention is especially suited for use by law enforcement personnel for commercial vehicle enforcement operations, but it may be used in a variety of applications where a portable scale is beneficial.

2. Background Information

Various state and federal laws, regulations and rules specify the maximum weight of a commercial vehicle load for travel over a particular roadway. Commercial vehicles are commonly weighed at fixed base scale facilities located throughout the various states, most commonly on major highways and other primary road systems. Fixed base scale facilities have stationary scales that are relatively large and durable, but also very sensitive. They can typically weigh either the weight of an entire vehicle, or alternatively the load on an axle, or even a specific wheel. Fixed base scale facilities are commonly operated by law enforcement personnel who are charged with the responsibility for enforcement of vehicle weight laws. Such personnel are typically specialists who handle high volume weight enforcement. Since the facilities require significant infrastructure a limited number of these facilities exist. However, since commercial vehicles travel over all classes of roads, including secondary, tertiary and rural roads on which no weighing facilities exist, the need exist for portable mobile scale systems that can be transported and used by mobile law enforcement personnel who monitor such non-primary motorways. To be portable, the mobile scale systems must be compact and light weight. Due to their smaller size, measurement typically is made of the load on a single wheel, or alternatively single axle using two scale units. Since police officers in squad cars tend to be law enforcement generalists, the mobile scale systems must be easy to deploy, use, and re-store, for example in the trunk of a squad car. They must be useable on a variety of vehicle types, with a variety of loads, on a variety of surfaces, including roadways, roadway shoulders, parking lots, and unfinished (and often uneven) surfaces consisting of gravel, soil, gravel, snow, ice, and the like. They must also be useable in a variety of conditions of temperature, humidity, pressure and the like. Notwithstanding all of these challenges, because mobile weigh scale systems are an instrument of law enforcement, they must be reliable and highly accurate. Lastly, they must be durable so that they withstand repeated cycles of storage, deployment and re-storage, all by non-specialized users in a variety of conditions.

Existing technology in this field is believed to have significant limitations and shortcomings. For this and other reasons, a need exists for the present invention.

All US patents and patent applications, and all other published documents mentioned anywhere in this application are incorporated by reference in their entirety.

BRIEF SUMMARY OF THE INVENTION

The invention provides a weighing apparatus and method which are practical, reliable, accurate and efficient, and which are believed to fulfill a need and to constitute an improvement over the background technology.

The portable mobile scale system of the present invention is suitable for transport and use by mobile law enforcement personnel who monitor the majority of state and federal motorways. The mobile scale system utilizes dual (two-2) weigh pads. The mobile scale system is compact and light weight. The system is useable by law enforcement generalists. The system is easy to deploy, use, and re-store, for example in the trunk of a squad car. The system is useable on a variety of vehicle types (semi-tractor trailers to smaller trucks), with a variety of loads (from 2,000 to 30,000 pounds) on a variety of surfaces including roadways, roadway shoulders, parking lots, and unfinished (and often uneven) surfaces consisting of gravel, soil, gravel, snow, ice, and the like. The system is useable in a variety of conditions of temperature, humidity, pressure and the like. The system is reliable and highly accurate. They are also durable and can withstand repeated cycles of storage, deployment and re-storage, all by non-specialized users in a variety of conditions.

The scale system is particularly useful for use with dual tire configurations to measure the individual tire loads within such configurations. The Scale can he used alone as a standalone unit, operated in pairs, or configured in groups of four, six, or more to measure support load, wheel load, axle load, axle group load, and/or the total weight of a multi-axle truck.

The scale system solves a particular problem in the industry of identifying overrated tires in dual-tire set ups. Although exceeding the weight capacity of an individual tire is an out-of-service violation in the US, the relevant safety regulations have been essentially unenforceable due to the absence of a scale capable of measuring individual tire loads within dual tire configurations. Tire loading and tire conditions impact braking distance, and tire failure can lead to accidents and debris on roads. Despite the fact that tire failures within dual-tire setups have historically occurred more frequently on inner tires than outer tires, individual tires in a dual-wheel configuration were assumed to carry near equivalent loads because there was no scale , until the present invention, which could directly measure individual tire weights. The result has been that private industry has potentially been driving inefficient and unsafe vehicles, damaging public infrastructure and their own tires. The present invention permits direct measurement of individual tire loading within dual-tire configurations. This enables vehicle inspectors to identify overrated tires with safety, efficiency, and, most importantly, accuracy. Overrated tires are not only a major safety concern, they can also cause a cascade of costly equipment failures. When an overloaded tire blows, the weight it was carrying is transferred to the remaining tires, causing these tires to carry more load than their ratings allow and leading to further damage down the line. In addition, tire loading and tire conditions affect fuel and braking efficiency, making individual tire weights a critical piece of information that would be useful for private industry as well as state enforcement agencies. For example, preliminary studies indicate inside tires bear significantly more weight than the outside tires if the inflation PSIs are equal, suggesting that adjustments to the tire air pressures might better equalize the weight load distribution. With the Dual Wheel Load scale of the invention, it is now possible for vehicle inspectors to identify unequal weight distribution within a dual wheel with one portable digital scale. The scale will also enable government agencies to set and enforce safety standards and may lead to new efficiency standards within private industries to regulate and adjust weights on each tire.

In one aspect, the invention provides a weigh scale, including:
   a base for placement on a surface;
   at least one first load cell, the at least one first load cell being elongated and having a long axis, a short axis, and a top surface, the at least one first load cell being fixedly coupled to the base;
   at least one second load cell, the at least one second load cell being elongated and having a long axis, a short axis, and a top surface, the at least one second load cell being fixedly coupled to the base;
   a first platform contacting the top surface of the at least one first load cell, the first platform being fixedly coupled to the at least one first load cell, the first platform being adapted to receive a load from a first wheel of a vehicle; and
   a second platform contacting the top surface of the at least one second load cell, the second platform being fixedly coupled to the at least one second load cell, the second platform being adapted to receive a load from a second wheel of a vehicle.

In another aspect, the invention provides a weigh scale for a vehicle having side by side wheels, including:
   a. a base for placement on a surface, the base having a planar top with at least a first set of recesses including at least two recesses, and a second set of recesses including at least two recesses;
   b. a first set of load cells, the first set of load cells including at least two load cells, each load cell being elongated and having a long axis, a short axis, and a top surface, the load cells being aligned parallel to each other, each load cell being fixedly coupled to the base, and each load cell being disposed over a recess of the first set of recesses;
   c. a second set of load cells, each second set of load cells including at least two load cells, each load cell being elongated and having a long axis, a short axis, and a top surface, the load cells being aligned parallel to each other, each load cell being fixedly coupled to the base, and each load cell being disposed over a recess of the second set of recesses;
   d. a first platform contacting the top surface of each of the load cells of the first set of load cells, the first platform being fixedly coupled to each load cell, the first platform being adapted to receive a load from a first wheel of a vehicle; and
   e. a second platform contacting the top surface of each of the load cells of the second set of load cells, the second platform being fixedly coupled to each load cell, the second platform being adapted to receive a load from a second wheel of a vehicle, disposed side by side to the first wheel of the vehicle.

In a further aspect, the invention provides an electronic weigh scale for a vehicle having side by side wheels, including:
   a. an elongated base for placement on a surface, the base having a planar top with at least a first set of recesses including at least two recesses, and a second set of recesses including at least two recesses;
   b. a first set of load cells, the first set of load cells including at least two load cells, each load cell being elongated and having a long axis, a short axis, and a top surface, the load cells being aligned parallel to each other, each load cell being fixedly coupled to the base, and each load cell being disposed over a recess of the first set of recesses, each load cell of the first set of load cells having:
     i. first and second, opposing, longitudinal edges, and wherein each longitudinal edge has a plurality of spaced apart notches forming spaced apart lateral members, and wherein the notches and lateral members of the first longitudinal edge being aligned with the notches and lateral member of the second longitudinal edge, and
     ii. a planar top with at least two raised elements extending from the planar top a predetermined distance, the raised elements being aligned with each other along a long axis of the load cell, each raised element being laterally aligned with and disposed between an opposing pair of lateral members;
   c. a second set of load cells, each second set of load cells including at least two load cells, each load cell being elongated and having a long axis, a short axis, and a top surface, the load cells being aligned parallel to each other, each load cell being fixedly coupled to the base, and each load cell being disposed over a recess of the second set of recesses, each load cell of the second set of load cells having:
     i. first and second, opposing, longitudinal edges, and wherein each longitudinal edge has a plurality of spaced apart notches forming spaced apart lateral members, and wherein the notches and lateral members of the first longitudinal edge being aligned with the notches and lateral member of the second longitudinal edge, and
     ii. a planar top with at least two raised elements extending from the planar top a predetermined distance, the raised elements being aligned with each other along a long axis of the load cell, each raised element being laterally aligned with and disposed between an opposing pair of lateral members;

d. a first platform contacting the top surface of each of the load cells of the first set of load cells, the first platform being fixedly coupled to each load cell, the first platform being adapted to receive a load from a first wheel of a vehicle; and e. a second platform contacting the top surface of each of the load cells of the second set of load cells, the second platform being fixedly coupled to each load cell, the second platform being adapted to receive a load from a second wheel of a vehicle, disposed side by side to the first wheel of the vehicle.

The aspects, features, advantages, benefits and objects of the invention will become clear to those skilled in the art by reference to the following description, claims and drawings.

BRIEF DESCRIPTION OF THE SEVERAL VIEWS OF THE DRAWING

FIG. 5 is a top, plan view of an embodiment of a base for use with the dual platform weigh scale of FIG. 1.

FIG. 6 is a side elevation view of the base.

FIG. 7 is a bottom view of the base.

FIG. 8 is a side elevation view relative to FIG. 7.

FIG. 9 is another top view of the base, showing further details.

FIG. 10 is a cross-sectional view of the base taken along line 10-10 of FIG. 9.

FIG. 11 is a detailed view of a portion of the base taken at area "11" of FIG. 10.

FIG. 12 is a perspective view of an embodiment of a platform or weigh pad, used with the dual platform weigh scale of FIG. 1.

FIG. 13 is a top view of the platform.

FIG. 14 is a side elevation view of the platform.

FIG. 15 is a perspective view of an embodiment of a load cell for use with the dual platform weigh scale of FIG. 1.

FIG. 16 is a top, plan view of the load cell.

FIG. 17 is a side elevation view of the load cell, partially in cross-section.

FIG. 18 is a bottom view of the load cell.

FIG. 19 is a detailed view of a portion of the load cell taken at area "19" of FIG. 16.

FIG. 20 is a cross-sectional view of a portion of the load cell taken at area "20" of FIG. 17.

DETAILED DESCRIPTION

Figure 1:
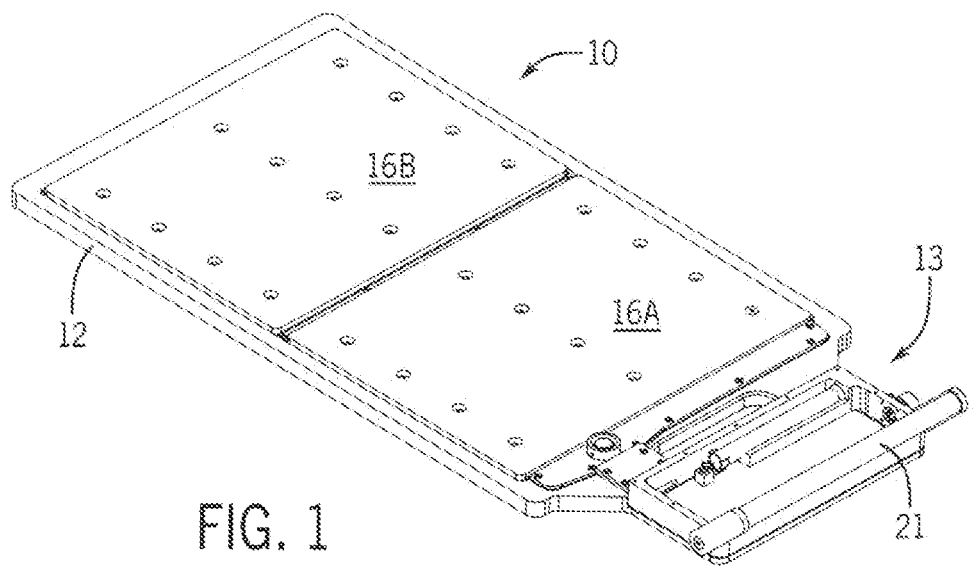
FIG. 1 is a perspective view of an embodiment of a dual platform weigh scale of the present invention.

The description that follows describes, illustrates and exemplifies one or more embodiments of a sensor interface system. This description is not provided to limit the disclosure to the embodiments described herein, but rather to explain and teach various principles to enable one of ordinary skill in the art to understand these principles and, with that understanding, be able to apply them to practice not only the embodiments described herein, but also other embodiments that may come to mind in accordance with these principles. The scope of the instant disclosure is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers in cases where such labeling facilitates a more clear description. The drawings set forth herein are typically drawn to scale, but in some instances proportions may have been exaggerated to more clearly depict certain features.

Figure 2:
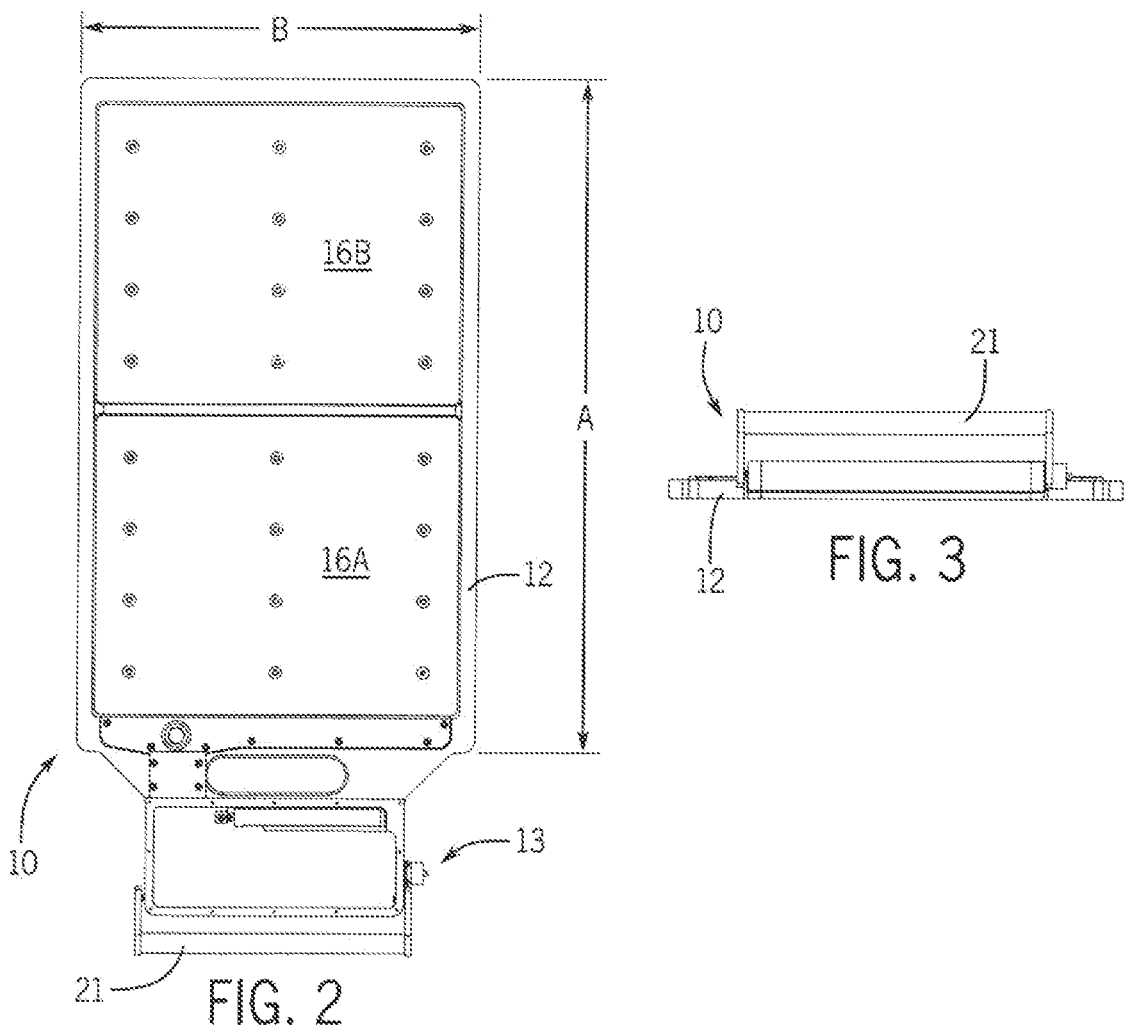
FIG. 2 a top, plan view of the weigh scale.
Figure 3:
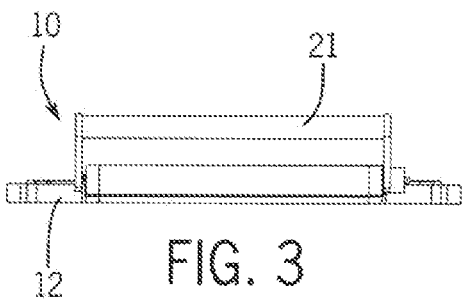
FIG. 3 is first end elevation view of the weigh scale.

FIGS. 1-3 show an embodiment of a dual platform weigh scale 10 of the present invention. The dual platform scale 10 is well suited for use in enforcement of commercial vehicle weight (overweight) enforcement laws by weighing wheels, axles, axle groups and entire vehicle weights in a static mode. The scale 10 is also useable for setting up mobile weigh station to weigh multiple vehicles in a dynamic, or weigh in motion (WIM) mode. This is applicable for vehicle weight data collection and for enforcement in some jurisdictions. The scale 10 is optimized for use on roadsides in areas where weight restriction violators typically avoid fixed based weight stations.

The dual platform scale 10 is highly mobile and portable. It is light in weight and low in profile. In the preferred embodiment, the scale 10 has a weight of only approximately thirty five (35) pounds. It is easy to lift, carry and position. Preferred dimensions of the scale 10 are shown. The maximum platform height is 0.86 inches. This makes the scale 10 easy to move by law enforcement personnel, and easy for vehicle drivers to position the vehicle for weighing. The scale 10 is also self-contained. It is battery powered and has a solar panel that yields an extended period of operation of up to one (1) year with daytime, outdoor use. The scale 10 can weigh wheels, axles, wheel/axle groups and total gross vehicle weight. This data is displayed on the scale 10 via an onboard, easy to read one (1.0) inch (25.0 millimeter) LCD (with auto back light) indicator display 17. The approximate weighing capacity of the scale 10 is 22,000 pounds, wherein each platform 16 A/B supports 11,000 pounds. The scale 10 also preferably has a cable free, wireless communication feature that permits remote control and transmission of weight data to a remote controller/indicator(s) for control, data collection, ticketing and reporting. The scale 10 circuitry (described below) does not require an external antenna. Communication is permitted up to approximately 300 feet (90 meters) with a line of sight link. The scale is useable and interconnectible with various ancillary weighing systems of Applicant, Intercomp Company, including the PT20™ CPU controller, the HH60™ RFX Indicator, and IntercompWeigh™ Software, to provide a full service weighing process.

Figure 4:
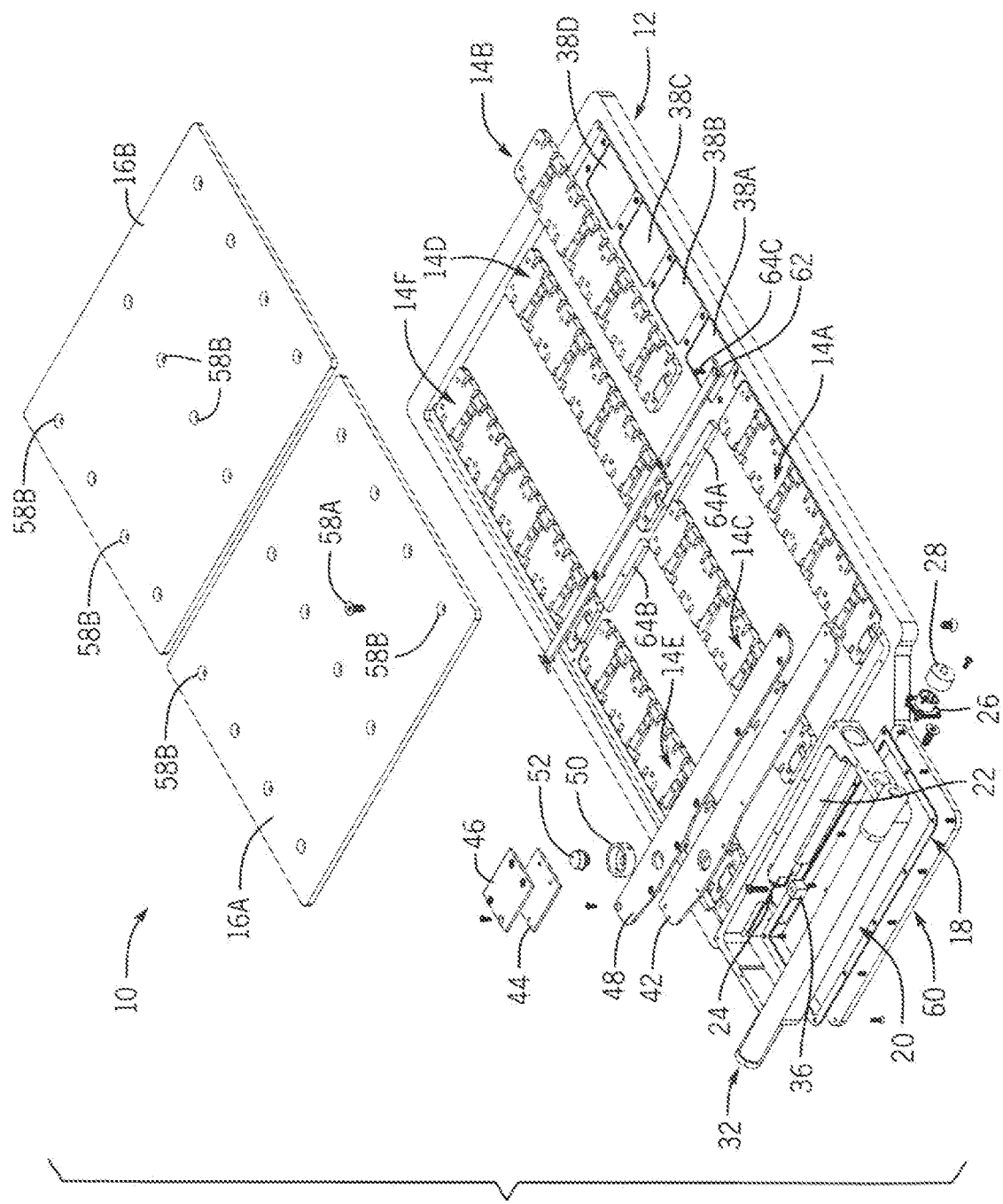
FIG. 4 is an exploded view of the weigh scale.

Referring also to FIG. 4, the scale 10 comprises a base 12, a plurality, preferably six (6), load cells 14 A-F, significantly two (2) platforms or pads 16A and 16B, and an electronic control assembly 60. The scale 10 has a generally rectangular configuration with a long or longitudinal aspect or axis "A" and a short or lateral aspect or axis "B". The base 12 is also generally rectangular and serves as the bottom member of the assembly 10 and is placed on the surface on which weighing will take place, typically a roadway, road shoulder, parking lot, or the like. The plural load cells 14 A-F have an elongated configuration and are disposed on the top surface of the base 12. The load cells 14 are arranged in a side-by-side fashion so that their long axes are oriented parallel to or along the long axis of the base 12. In this embodiment, preferred dimensions are 35 inches in length and 15.5 inches in width with an approximate 1.0 inch height. The top surface of the base 12 has a recessed interior portion that is surrounded by an outer rim and is open at its top. The base 12 also has a proximal end portion 13 that serves as the foundation of electronic control assembly 60 components of the scale 10. The load cells 14 are disposed within the recessed portion of the base 12. The platforms 16 A/B are also generally rectangular and disposed above the base 12 and load cells 14. The platforms 16 A/B are in communicative contact with the load cells 14, platform 16A contacting load cells 14 A, C and E, and platform 16 B contacting load cells 14 B, D and F. The platforms 16 are directly contacted by the tires or other wheel elements of the vehicle being weighed. The load cells 14 are arranged in two (2) sets of three (3) load cells each. The first set consists of load cells 14A, 14C and 14E aligned parallel to each other and spaced apart on base 12 below pad or platform 16A. The second set consist of load cells 14B, 14D and 14E similarly disposed and aligned below platform 16B.

The electronic control assembly 60 includes a control and indicator circuit board and battery power tube (preferably four (4) cell) 22 and holder 24, both disposed in an indicator housing 20. A handle assembly 11 is coupled to the housing.

FIGS. 5-10 show details of an embodiment of the base 12 of the scale 10. FIG. 5 shows the top side of the base 12 and FIG. 7 shows the bottom side of the base 12. The base 12 is constructed of a rigid metal, for example a high strength Aluminum Alloy, such as 7075-T6 Aluminum. It has a long or longitudinal aspect or axis and a short or lateral aspect or axis. The base 12 has a rectangular main portion which has the recessed portion and contains the load cells 14 A-F. The corners of the base 12 are preferably radiused. In this embodiment, referred dimensions of the base 12 are 26 inches in length (excluding the proximal control portion 13), 17 inches in length, and 0.86 inches in height. As is best shown in FIGS. 4 and 5, the bottom of the base 12 is flat with plural shallow recesses 38, that are arranged in six (6) sets of four (4) A, B, C and D, corresponding to four recesses 39A-D for each load cell 14.

FIGS. 12-14 are perspective, top and side elevation views, respectively, an embodiment of the platforms 16 A and 16 B of the dual platform scale 10. Each platform 16 is also constructed of a rigid metal, such as 7075-T6 Aluminum. It also has a long or longitudinal aspect or axis and a short or lateral aspect or axis. Each platform 16 has a rectangular configuration. In this embodiment, platform 16 preferred dimensions are 15.5 inches in length, 12.75 inches in width, and 0.25 inches in thickness. Its corners are preferably radiused. When operatively placed, the platforms 16 are coplanar with the top of the base 12. Each platform 16 has apertures 58B that are aligned with apertures 72 A-E of the load cells 14 when operatively disposed. These receive fasteners 58A.

FIGS. 15-18 are isometric, top, side and bottom views, respectively, of an embodiment of a load cell 14 A-F of the scale 10. In the preferred embodiment, there are six (6) load cells 14 A-F. Each load cell 14 is constructed of a metal, for example 2024-T361 Aluminum. Each load cell 14 has an elongate configuration with radiused corners. Each load cell 14 has a long or longitudinal aspect or axis and a short or lateral aspect or axis. In this embodiment, preferred dimensions are 12.75 inches in length, 2.4 inches in width, and 0.25 inches in thickness. Notches 74 form lateral members 76. In this embodiment, there are sixteen (16) notches 74 on each side (aligned side to side) spaced approximately 0.667 inches from each other, on center. The notches have a length of approximately 0.375 inches with radiused inside ends. Four (4) major raised elements 66 A-D extend (0.155 inches) from the top of the body of the load cells 16, spaced apart from each other a predetermined distance. In this embodiment, the elements 66 are 1.194 inches long and 0.375 inches wide. Four (4) minor raised elements 68 A-D similarly extend from the top of the body of the load cells 16. In this embodiment the elements 68 are 0.331 inches wide and 0.375 inches long. Overall in this embodiment, the distance between the bottom surface of the body of the load cell 16 to the top of the is 0.405 inches. Apertures 70 are disposed centrally in each major element 66 and mate with fasteners 58A through apertures 58B in platforms 16 to connect join the platforms 16 in three (3) parallel aligned sets of load cells per platform to form two (2) top weigh pads of the scale 10. Referring also to FIG. 4, major elements 66 are centrally disposed over recesses 38 of base 12. On the bottom, the load cells 14 are connected to the base 12 via fasteners (not shown) which extend through apertures 40 (disposed in pairs A-B) in the to mate with apertures 72 in the body of the load cells 16. The load cells 16 are this sandwiched and interconnected between the base 12 and the respective platforms 16, which permits optimized flexion and tension of the load cell, and associated strain gauges, from vehicle/tire loads applied to the platforms 16.

Figure 21A:
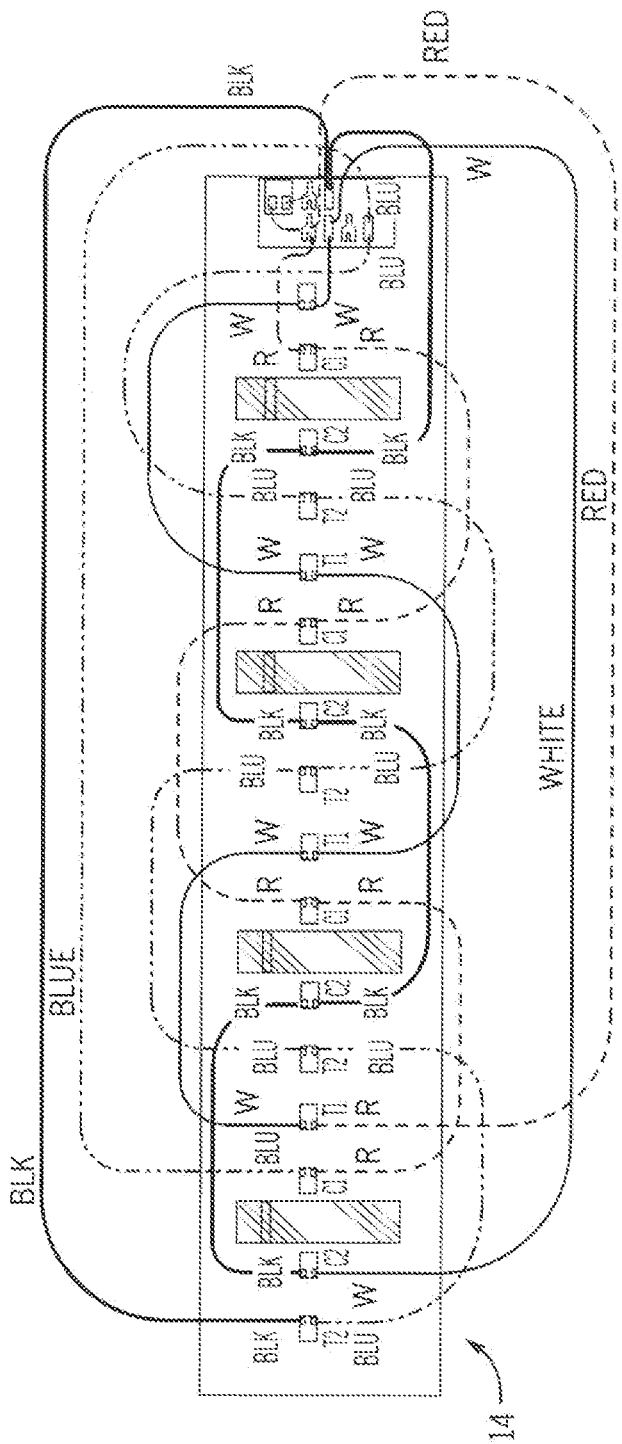
FIGS. 21A and B show an embodiment of an arrangement of strain gauges deployed on the load cell.
Figure 21B:
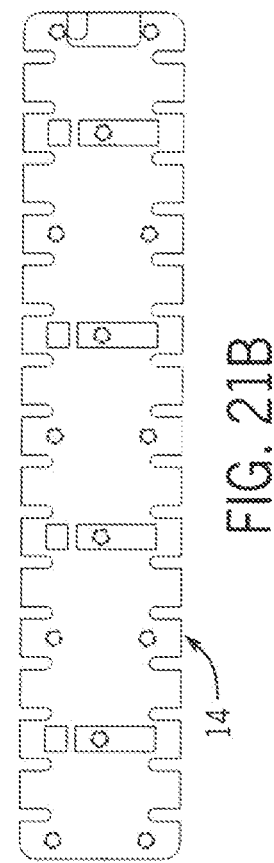
Figure 22:
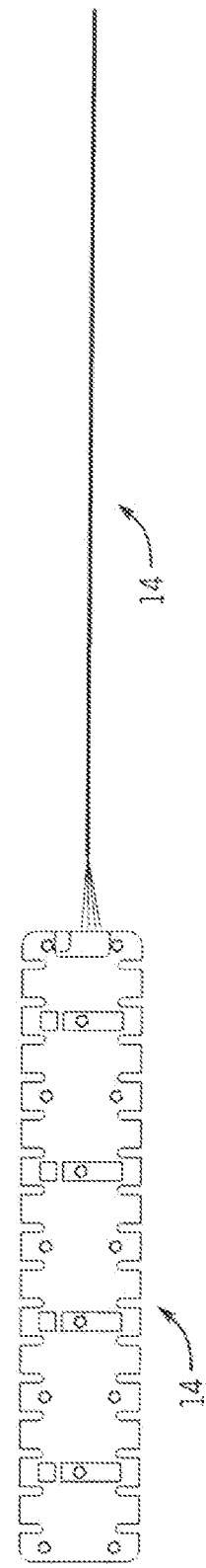
FIG. 22 shows an embodiment of an electronic cable for connecting the scale to a control system.
Figure 23A:
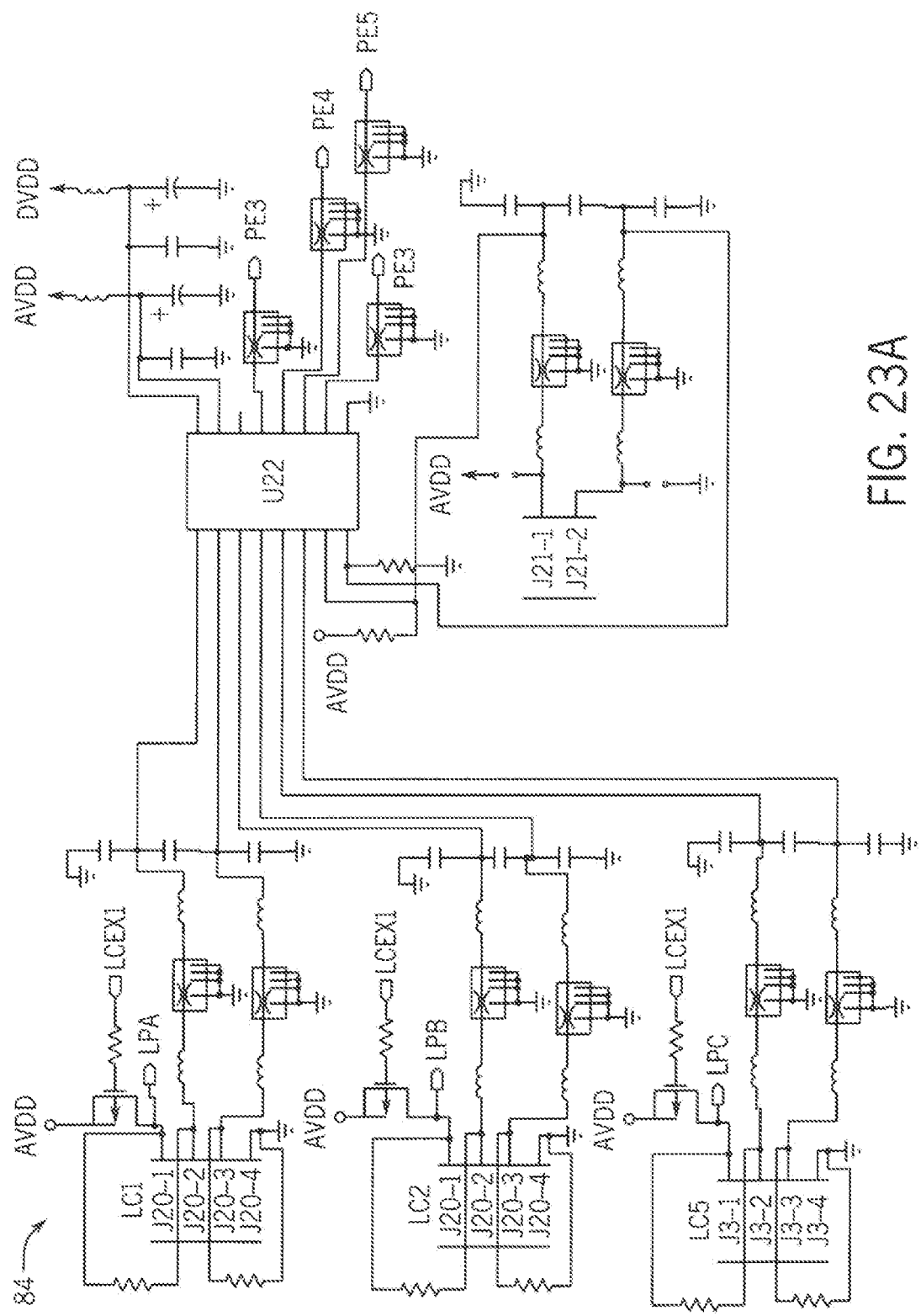
FIG. 23 is a schematic diagram of an embodiment of an electronic circuit for use in the scale.
Figure 23B:
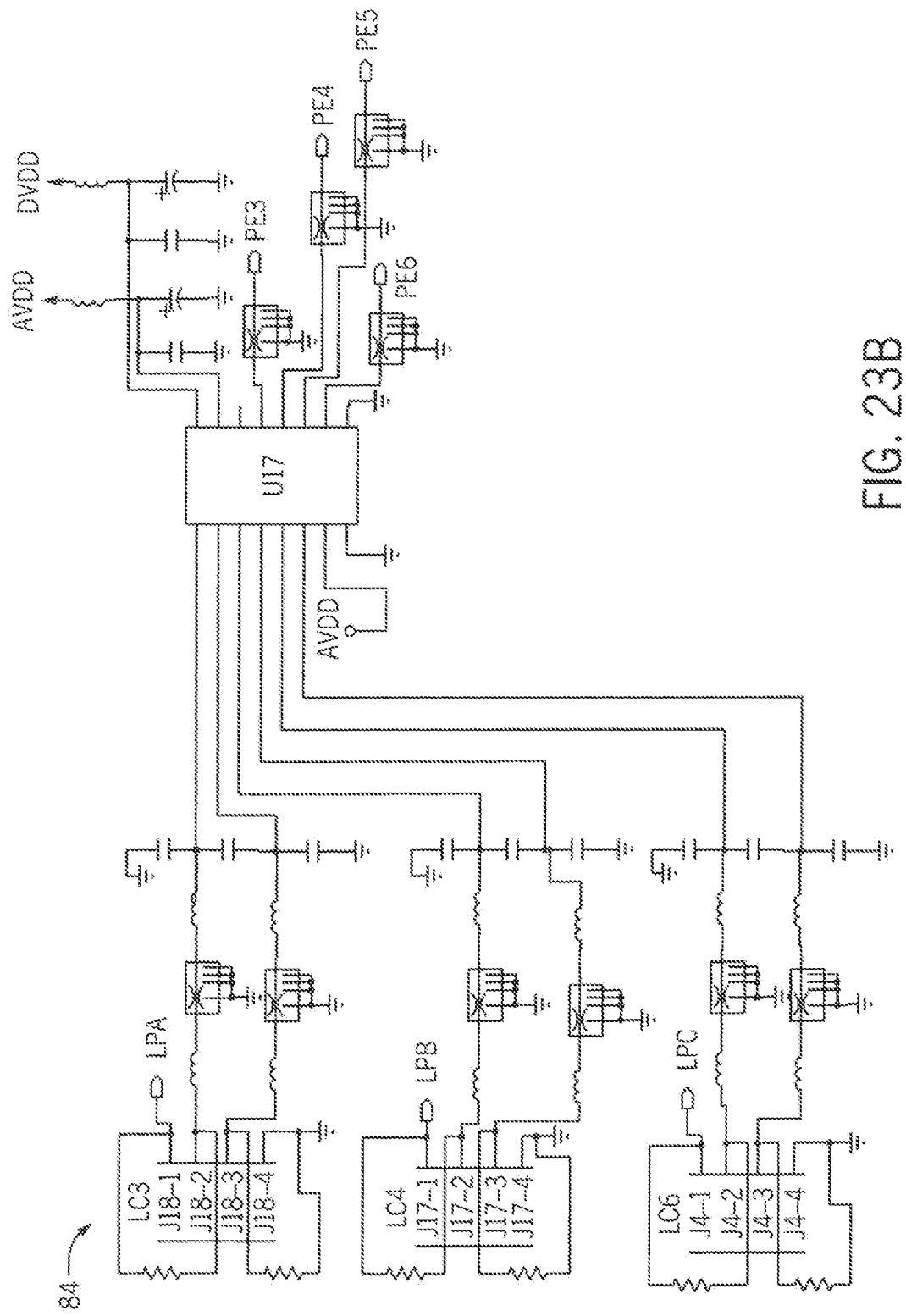
Figure 23C:
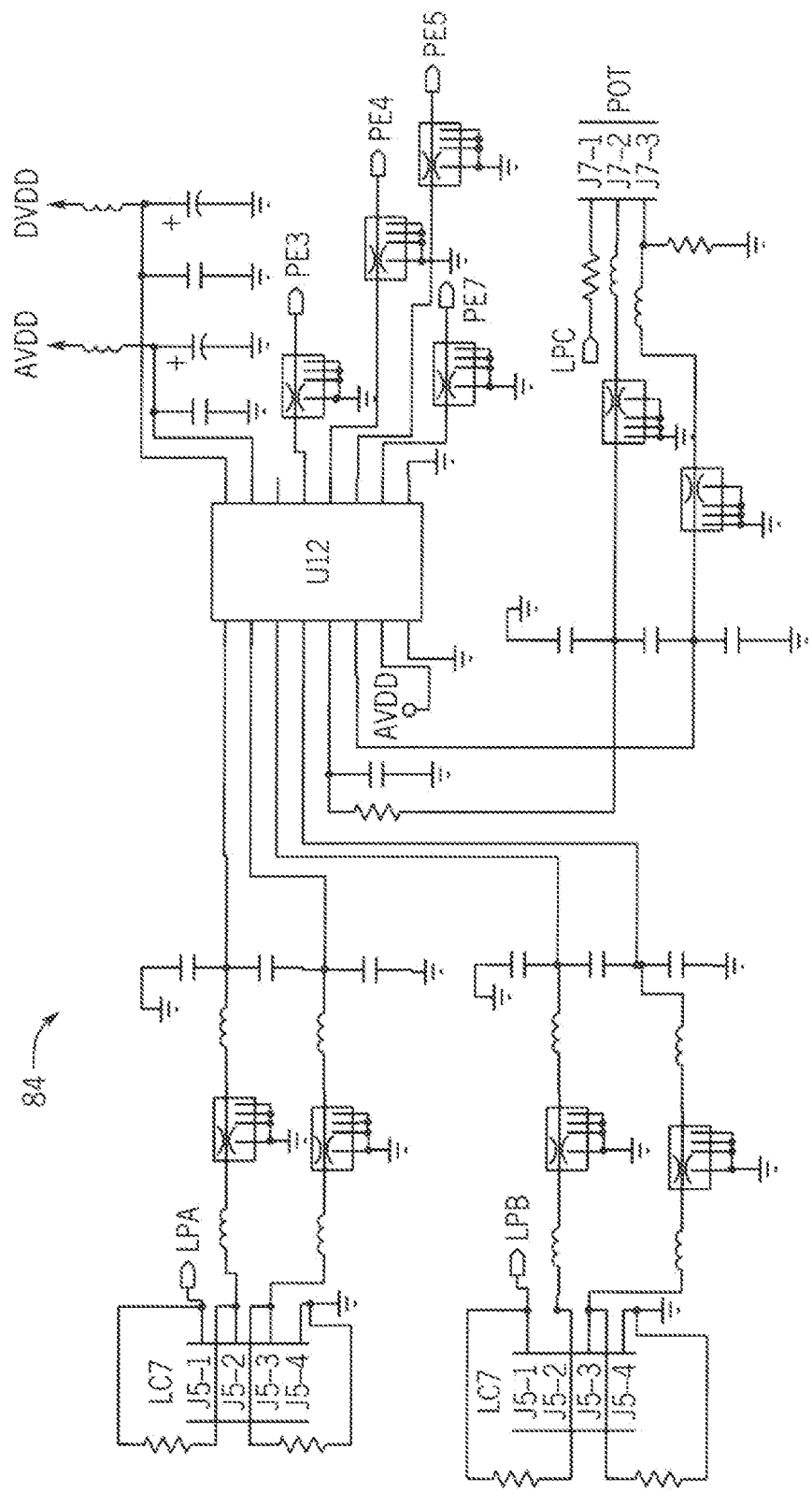
Figure 23D:
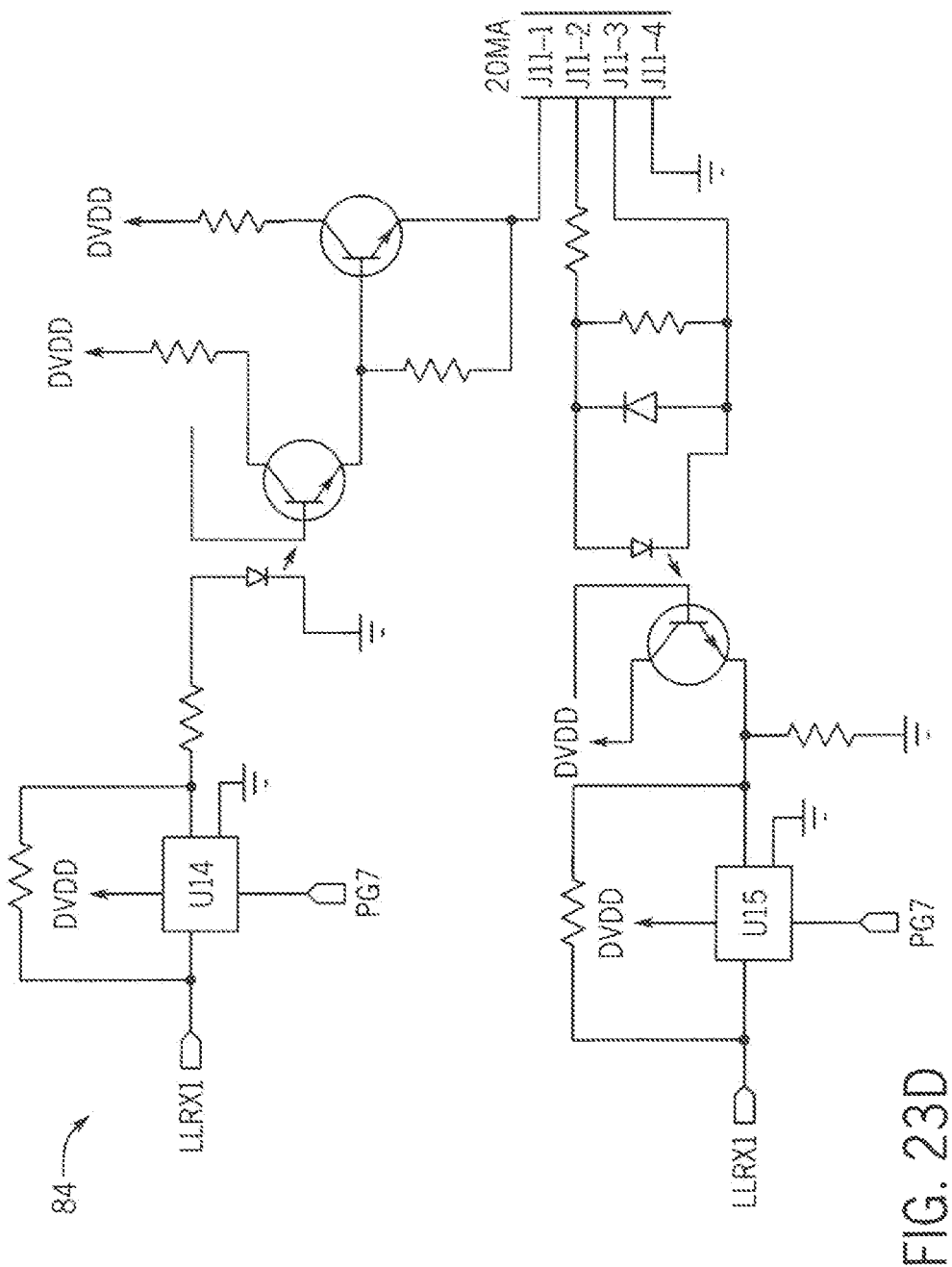
Figure 23G:
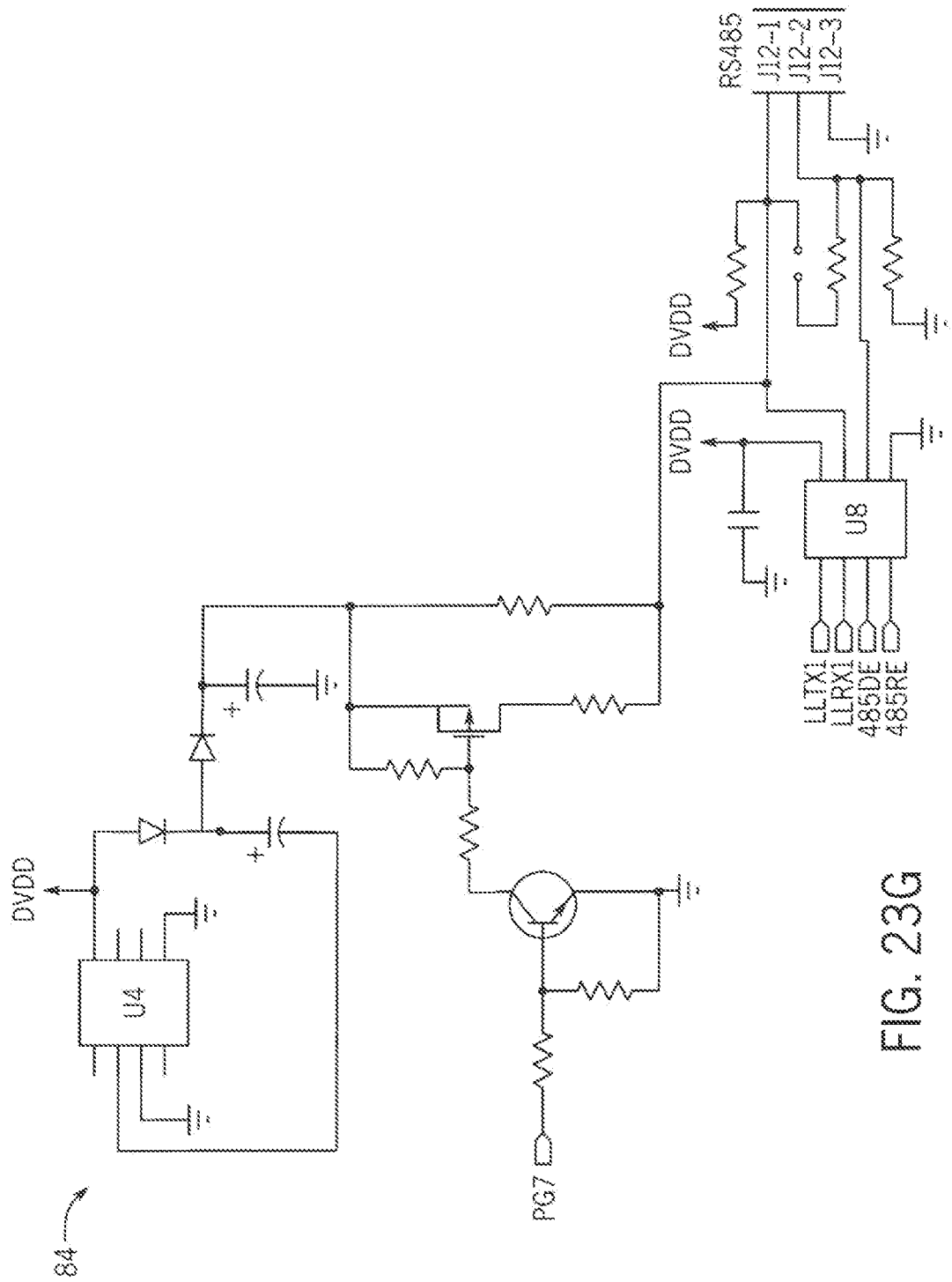
Figure 23H:
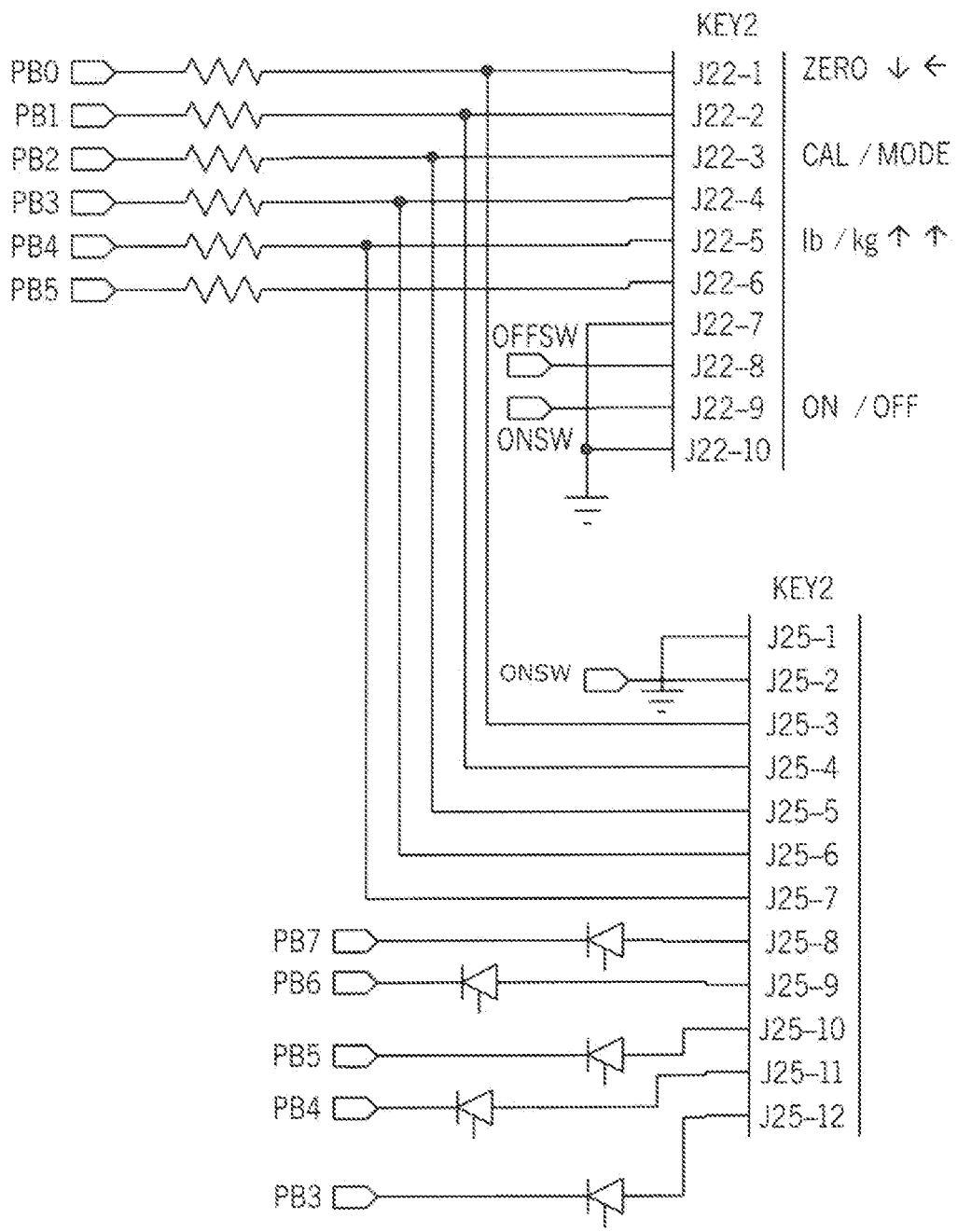
Figure 23K:
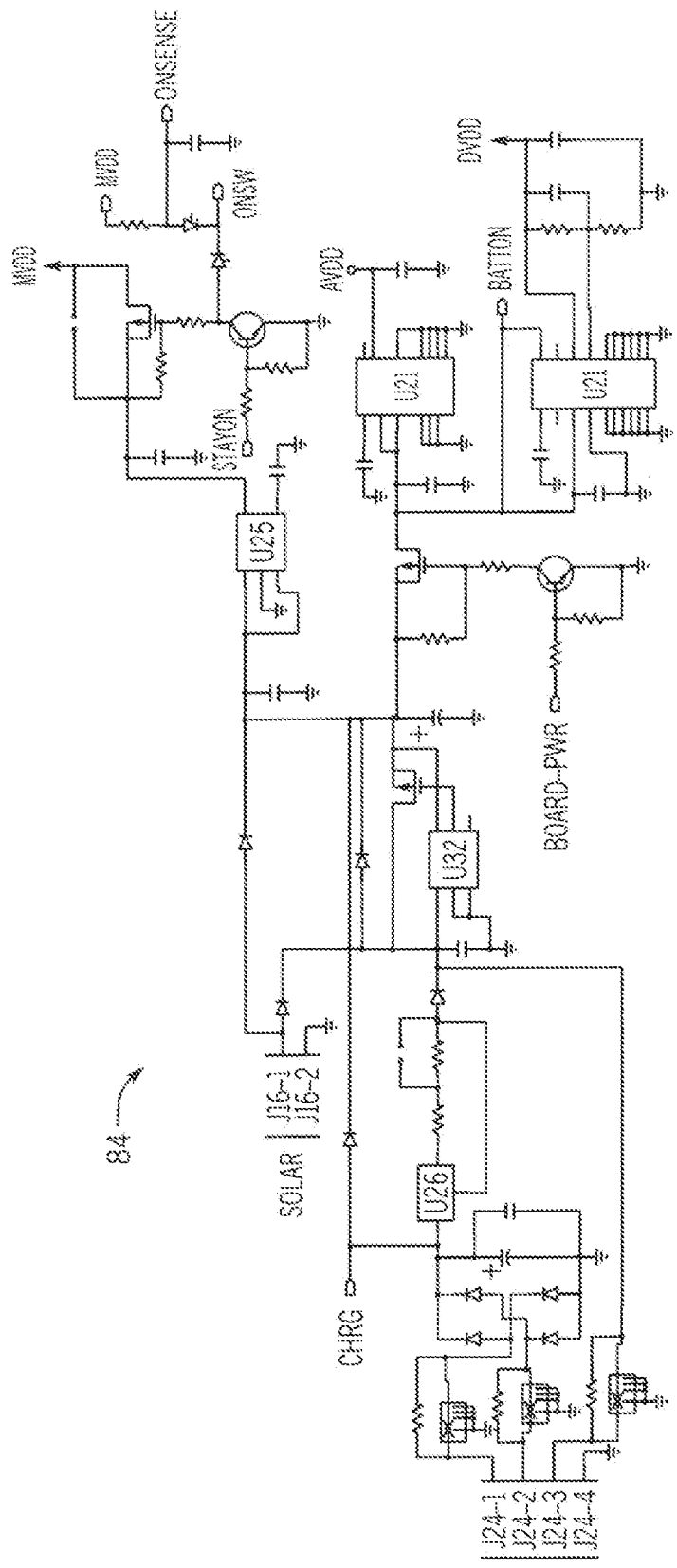
Figure 23N:
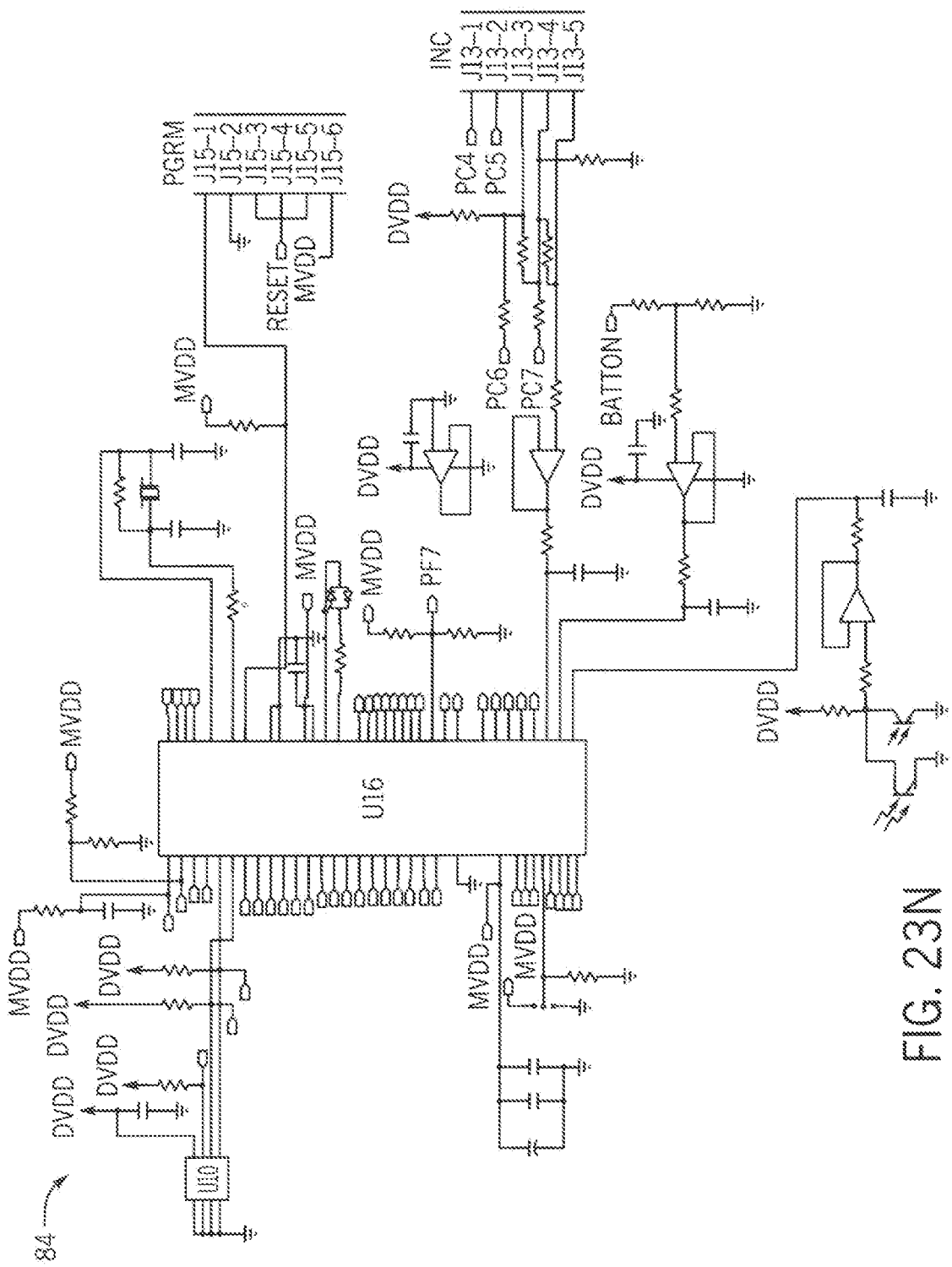
Figure 24A:
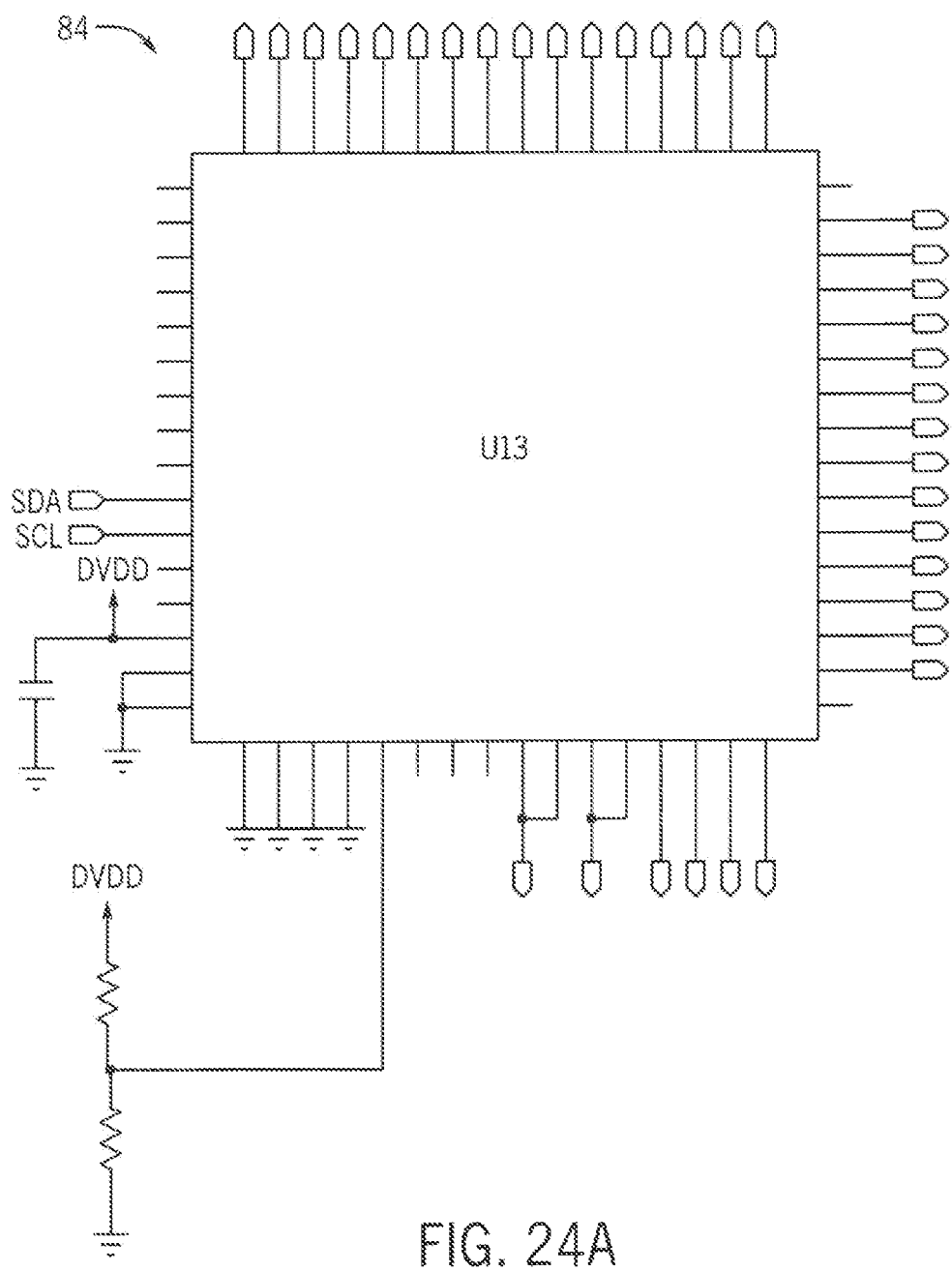
FIG. 24 is a further schematic diagram of the circuit.
Figure 24B:
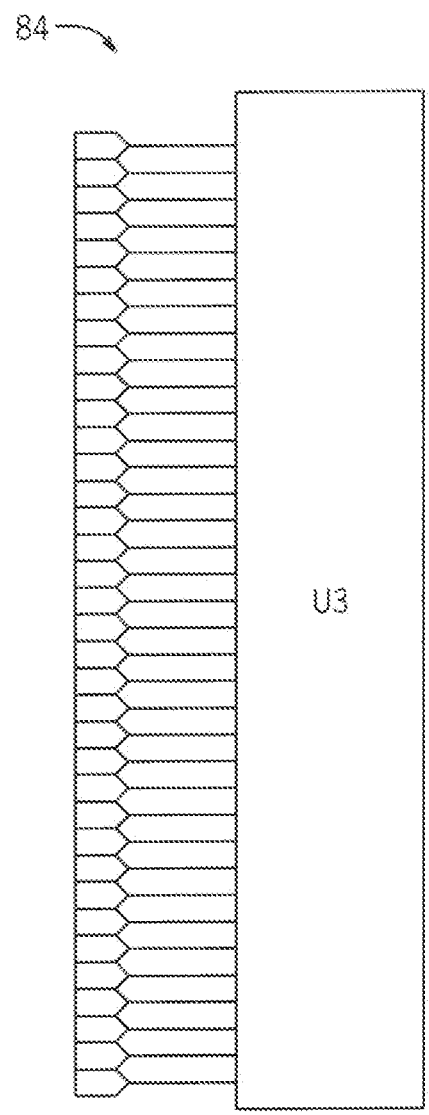
Figure 24C:
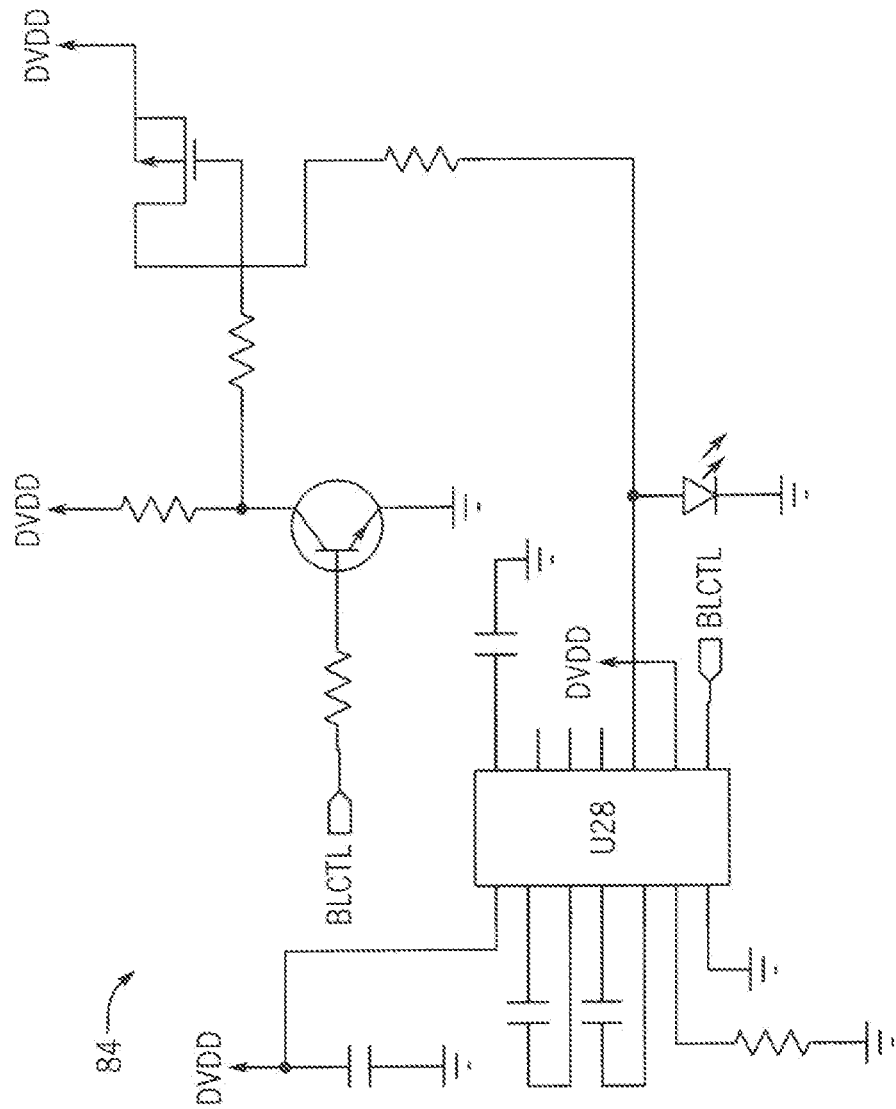
Figure 24F:
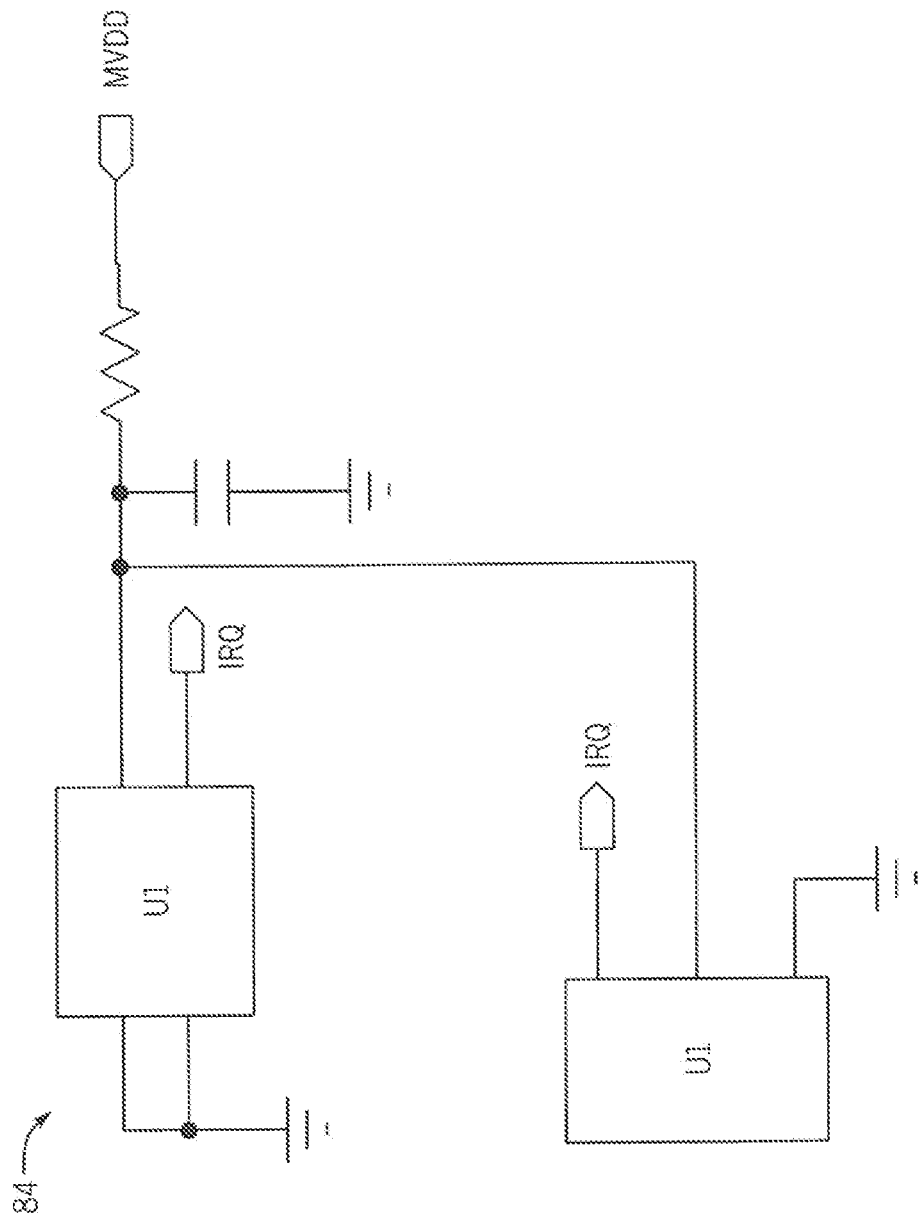

FIGS. 21A and B show an embodiment of an arrangement of strain gauges deployed on the load cell 16. FIG. 22 shows an embodiment of an electronic cable 80 for connecting the scale to a control system.

The scale 10 preferably has a controller which preferably has a control panel, a backlit LCD indicator 17, an optional self-contained printer, and a plurality of USB and RS232 electronic connection ports. These components are communicatively connected to a central processor and a power supply (preferably standard D-cell batteries). The controller has an RF wireless transmitter/receiver. These components are enclosed within a portable hardened case. The controller communicates with up to twelve (12) scales up to 300 feet (90 meters) distance—line of sight. The CPU processes weight data for monitoring and control of loads. Weight data include a scale layout or scale list with weight units, total weight, center of gravity, Gross, Net, Tare (GNT), altitude and latitude/longitude. System software allows for four optional user information fields, and seven optional vehicle information fields. Software also permits import/export, print and save for records. Weigh In Motion functions include vehicle class, gross vehicle weight, axle weight, and data storage while producing an array of reports for record keeping and data analysis. Actual weights can be compared to legal limits for enforcement purposes, as well as generating tickets on site.

FIGS. 23 and 24 are schematic diagrams of an embodiment of an electronic circuit for use in the scale. The self-contained, 12V, DC battery powered, electronic scale 10 has a control panel, an indicator, and preferably a solar panel. The control panel has On/Off, Zero, Local/Total, and Print/Accumulate buttons. Zero function is preferably automatic zero tracking (AZT) with the semi-automatic zero setting button. The scale 00 can weigh wheels, axles, wheel/axle groups and total gross vehicle weight. This data is displayed on the scale via the onboard, easy to read one (1) inch (25 millimeter) Liquid Crystal Display (LCD) Alphanumeric indicator/display. The display also preferably has an auto back light. The indicator further has Low Battery, Lb./Kg, Local and Total indicator cells. The scale 00 has a 12 VDC power connection for direct power and battery recharging. However, the solar panel recharges the batteries automatically and yields an extended period of operation of up to one (1) year with daytime, outdoor use. The scale 00 also has a cable free, wireless radio frequency (RF) communication feature that permits remote control and transmission of weight data to a remote controller/indicator(s) for control, data collection, ticketing and reporting. The scale 10 circuitry does not require an external antenna. Communication is permitted up to 300 feet (90 meters) with a line of sight link. The scale 10 further has an RS-485 communication port for cable communication when desired.

The scale 10 may be used in a system for Weigh In Motion (WIM) weighing. In the US, states must meet a federal requirement to collect commercial vehicle data and report back with this information. By deploying mobile, portable scale systems, state and local law enforcement personnel can capture weight data for federal compliance, and also use them for overweight enforcement. Portability for ease of setup, WIM capability for vehicle screening, NTEP certification for ticketing, and wireless communication for operation at a distance to maintain officer safety are among the scale's advantages. The scales are operable in WIM mode for screening vehicles, weighing several vehicles per minute and capturing over a hundred vehicle records per hour. The system's controller accumulates and displays axle and Gross Vehicle Weights (GVW) for an onboard printer, or for saving vehicle records to export via a USB port. Communication between the scales and indicator is done wirelessly, allowing cable-free operation at a safe distance (up to 300 ft.) from the active weighing zone. The weighing system consists of two scales 00 A and B, deployable ramps, levelers, and a wireless indicator. The system can be set up for use in less than ten minutes for operation as a portable weigh station, minimizing both officers' time and the opportunity for vehicle operators to circumvent the rapidly deployed mobile weigh station. Scales have integrated antennas for communication, eliminating external antennas which can be damaged during weighing's. Due to its portability, certified accuracy, and versatility of operation in WIM and static modes, the portable Weigh-In-Motion scale system is useable worldwide for vehicle screening and enforcement applications.

Figure 25:
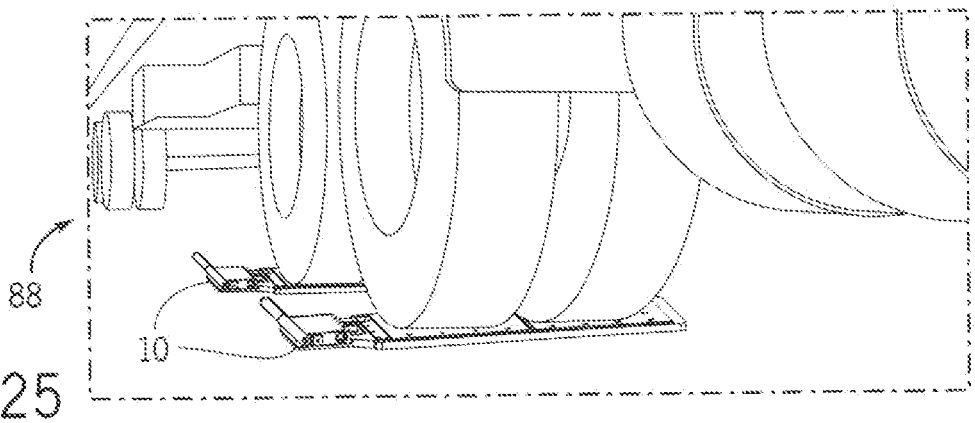
FIG. 25 shows the scale deployed weighing a vehicle where the dual pads are disposed under both tires of one side of an axle of the vehicle.
Figure 26:
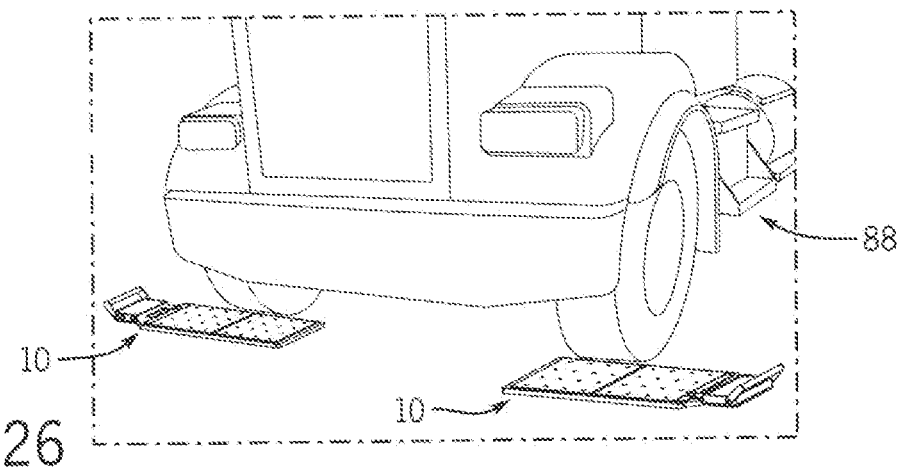
FIG. 26 shows scales deployed weighing the front wheels of a tractor vehicle, wherein only one tire of each side of an axle are disposed on one weigh pad of each of the scales
Figure 27:
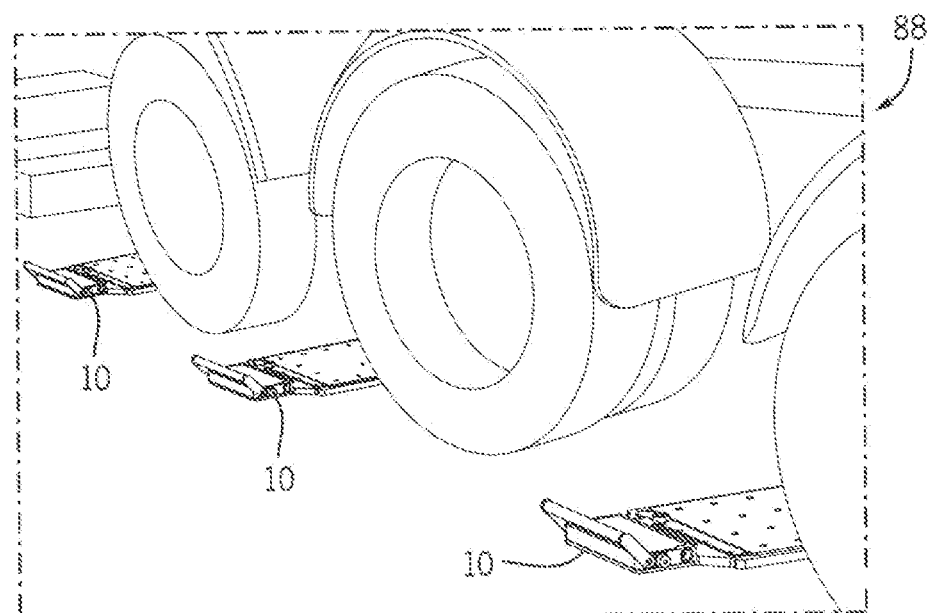
FIG. 27 shows a set of scales deployed for weighing plural vehicle axles simultaneously.

The scale system 10 is particularly useful for use with dual tire configurations to measure the individual tire loads within such configurations. The scale 10 can be used alone as a standalone unit, operated in pairs, or configured in groups of four, six, or more to measure support load, wheel load, axle load, axle group load, and/or the total weight of a multi-axle truck. The scale 10 is placed on a base surface and a single vehicle tire is rolled on top of it. FIG. 25 shows the scale 10 deployed weighing a vehicle 88 where the dual platforms or pads 16 A/B are disposed under both tires of one side of an axle of the vehicle 88. FIG. 26 shows scales 10 deployed weighing the front wheels of the tractor of the vehicle 88, wherein only one tire of each side of an axle are disposed on one weigh pad 16 of each of the scales 10 FIG. 27 shows a set of scales 10 deployed for weighing plural vehicle axles simultaneously.

Figure 28:
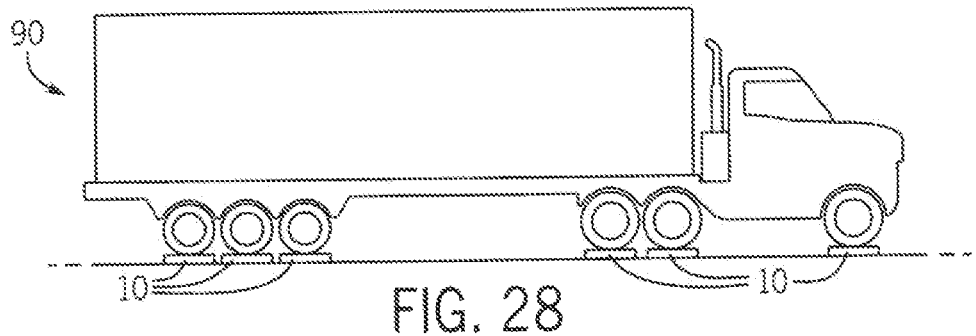
FIG. 28 is a diagram of an embodiment of a method of using the scales of the invention in a Single Step Weighing Process, where a scale is positioned under each wheel of the vehicle.
Figure 29A:
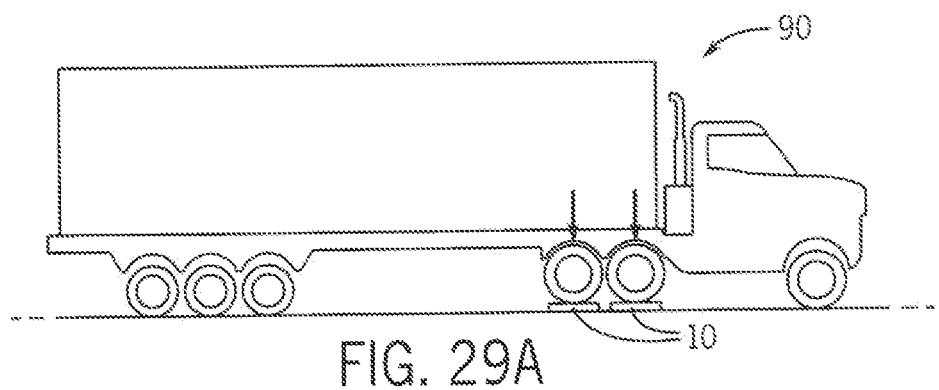
FIG. 29A, B and C are diagrams of an embodiment of a method of using the scales of the invention in an Axle Group Weighing Process, where scales are used to weigh individual multi-axle groups. An axle group is weighed with all axles of the group positioned on the same plane. Figures A and B show scale positioning for front and rear groups respectively. Figure C shows scale positioning where only one axle of a multi-axle group is being weighed and the other axles in the group are positioned on the same plane as the axle being weighed on a scale, by utilizing a roll-out ramp.
Figure 29B:
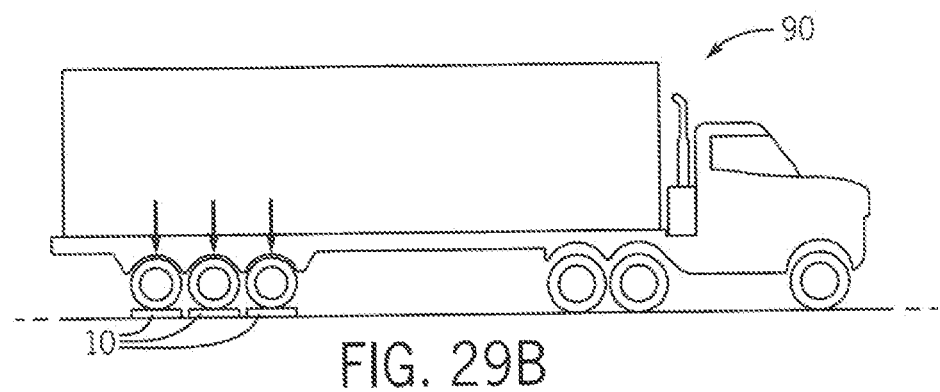
Figure 29C:
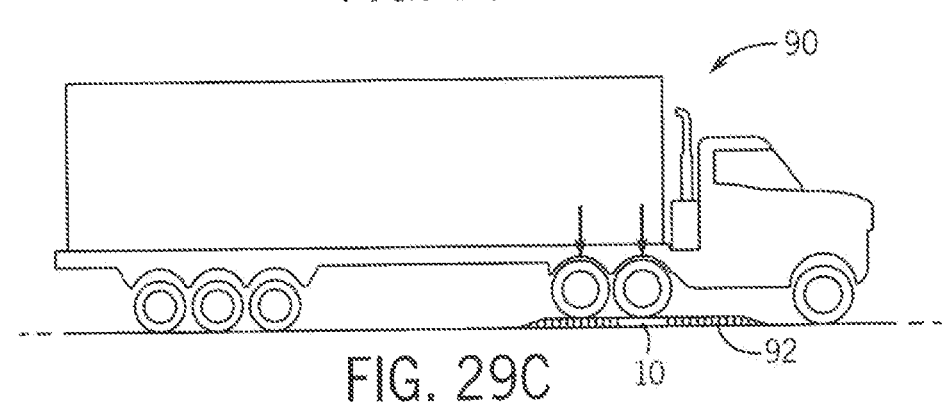

FIG. 28 is a diagram of an embodiment of a method of using a scale or set of scales 10 of the invention in a Single Step Weighing, where the scale 10 is positioned under each target wheel of a vehicle 90. FIG. 29A, B and C are diagrams of an embodiment of a method of using the scales 10 in an alternative, Axle Group Weighing Process, where scales 10 are used to weigh individual multi-axle groups. An axle group is weighed with all axles of the group positioned on the same plane. Figures A and B show scale 10 positioning for front and rear groups respectively. Figure C shows scale positioning where only one axle of a multi-axle group is being weighed and the other axles in the group are positioned on the same plane as the axle being weighed on a scale, by utilizing a roll-out ramp 92.

In summary, the portable mobile scale system 10 is suitable for transport and use by mobile law enforcement personnel who monitor the majority of municipal, county, state and federal motorways. The scale system 10 is compact and light weight. The system is useable by law enforcement generalists. The system is easy to deploy, use, and re-store, for example in the trunk of a squad car. The system 10 is useable on a variety of vehicle types (semi-tractor trailers to smaller trucks), with a variety of loads (from 2,000 to 22,000 pounds) on a variety of surfaces including roadways, roadway shoulders, parking lots, and unfinished (and often uneven) surfaces consisting of gravel, soil, snow, ice, and the like. The system 10 is useable in a variety of conditions of temperature, humidity, pressure and the like. The system is reliable and highly accurate. It is also durable and can withstand repeated cycles of storage, deployment and re-storage, all by non-specialized users in a variety of conditions.

Although the apparatus/method has been described in connection with the field of portable weighing, and particularly for motor vehicle law enforcement, it can readily be appreciated that it is not limited solely to such field, and can be used in other fields including, but not limited to any field utilizing scales and weighing.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom." "over." "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

Although the invention or elements thereof may by described in terms of vertical, horizontal, transverse (lateral), longitudinal, and the like, it should be understood that variations from the absolute vertical, horizontal, transverse, and longitudinal are also deemed to be within the scope of the invention.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time. e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein. "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments. "approximately" can mean within plus or minus one percent of the stated value.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim he construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A weigh scale, comprising
a base for placement on a surface;
at least one first load cell, the at least one first load cell being elongated and having a long axis, a short axis, and a top surface, the at least one first load cell being fixedly coupled to the base;
at least one second load cell, the at least one second load cell being elongated and having a long axis, a short axis, and a top surface, the at least one second load cell being fixedly coupled to the base;
a first platform contacting the top surface of the at least one first load cell, the first platform being fixedly coupled to the at least one first load cell, the first platform being adapted to receive a load from a first wheel of a vehicle;
a second platform contacting the top surface of the at least one second load cell, the second platform being fixedly coupled to the at least one second load cell, the second platform being adapted to receive a load from a second wheel of a vehicle;
wherein the base has a planar top surface; and
wherein the base planar top has at least two first recesses aligned with each other below the at least one first load cell, and wherein the planar top has at least two second recesses aligned with each other below the at least one second load cell.

2. The weigh scale of claim 1, wherein the at least one first load cell comprises at least two elongated load cells forming a first set of load cells, the at least two load cells of the first set of load cells being aligned parallel to each other and spaced apart from each other under the first platform, and wherein the at least one second load cell comprises at least two elongated load cells forming a second set of load cells, the at least two load cells of the second set of load cells being aligned parallel to each other and spaced apart from each other under the second platform.

3. The weigh scale of claim 2, wherein each set of load cells consists of three load cells aligned parallel to each other and spaced apart from each other under one platform.

4. The weigh scale of claim 3, wherein the elongated first, second and third load cells of the first set of load cells are aligned in tandem with the first, second and third load cells of the second set of load cells.

5. The weigh scale of claim 3, wherein the first and second platforms each has rectilinear outer edges, a planar top surface adapted to contact a load, and a planar bottom surface contacting respective three load cells, each platform having three parallel rows of apertures, each row of apertures having at least two apertures, the apertures receiving fasteners for connection to the load cells of the set of load cells.

6. The weigh scale of claim 1, wherein:
the base is elongated,
the at least one first load cell comprises at least two elongated load cells forming a first set of load cells, the at least two load cells of the first set of load cells being aligned parallel to each other and spaced apart from each other under the first platform, and wherein the at least one second load cell comprises at least two elongated load cells forming a second set of load cells, the at least two load cells of the second set of load cells being aligned parallel to each other and spaced apart from each other under the second platform;

there at least two recesses aligned in line with each other below each of the at least two load cells of the first set of load cells; and there are at least two recesses aligned in line with each other with each of the at least two load cells of the first set of load cells.

7. The weigh scale of claim 6, wherein each set of load cells consists of three load cells aligned parallel to each other and spaced apart from each other under one platform.

8. The weigh scale of claim 7, wherein there are four recesses aligned under each load cell.

9. The weigh scale of claim 1, wherein each elongated load cell is fixedly connected to the base by at least two base fasteners, each fastener being selected from the group of fasteners consisting of screws, bolts, welds, and adhesives, and wherein each load cell is fixedly connected to a respective platform by at least two platform fasteners selected from the group of fasteners consisting of screws, bolts, welds and adhesives.

10. The weigh scale of claim 9, wherein:

the at least two base fasteners are further arranged in pairs of fasteners, the fasteners of each pair of fasteners being aligned perpendicular to a direction of elongation of the load cell; and the at least two platform fasteners are aligned in the direction of elongation of the load cell.

11. The weigh scale of claim 9, wherein each load cell has a planar top with at least two raised elements extending from the planar top a predetermined distance, the raised elements being aligned with each other along a long axis of the load cell, the raised elements contacting a respective platform.

12. The weigh scale of claim 11, wherein each raised element has an associated minor raised element.

13. The weigh scale of claim 9, wherein each load cell has first and second, opposing, longitudinal edges, and wherein each longitudinal edge has a plurality of spaced apart notches forming spaced apart lateral members, and wherein the notches and lateral members of the first longitudinal edge being aligned with the notches and lateral member of the second longitudinal edge.

14. The weigh scale of claim 13, wherein each load cell further has a planar top with at least two raised elements extending from the planar top a predetermined distance, the raised elements being aligned with each other along a long axis of the load cell, the raised elements contacting a respective platform, each raised element being laterally aligned with and disposed between an opposing pair of lateral members.

15. The weigh scale of claim 14, wherein:

each raised element of a load cell is fixedly fastened to the respective platform by a platform fastener selected from the group of fasteners consisting of a screw, a bolt, a weld and an adhesive, and the load cell is further fixedly fastened to the base by a base fastener selected from the group of fasteners consisting of screws, bolts, welds, and adhesive, the base fasteners being disposed between the longitudinally disposed raised elements.

16. The weigh scale of claim 1, wherein the vehicle has side by side wheels.

17. A weigh scale for a vehicle having side by side wheels, comprising:

a. a base for placement on a surface, the base having a planar top with a first set of recesses including at least two recesses, and a second set of recesses including at least two recesses;

b. a first set of load cells, the first set of load cells including at least two load cells, each load cell being elongated and having a long axis, a short axis, and a top surface, the load cells being aligned parallel to each other, each load cell being fixedly coupled to the base, and each load cell being disposed over a recess of the first set of recesses;

c. a second set of load cells, each second set of load cells including at least two load cells, each load cell being elongated and having a long axis, a short axis, and a top surface, the load cells being aligned parallel to each other, each load cell being fixedly coupled to the base, and each load cell being disposed over a recess of the second set of recesses;

d. the first set of recesses of the base being aligned with each other below the first set of load cells, and the second set of recesses aligned with each other below the second set of load cells;

e. a first platform contacting the top surface of each of the load cells of the first set of load cells, the first platform being fixedly coupled to each load cell, the first platform being adapted to receive a load from a first wheel of a vehicle; and f. a second platform contacting the top surface of each of the load cells of the second set of load cells, the second platform being fixedly coupled to each load cell, the second platform being adapted to receive a load from a second wheel of a vehicle, disposed side by side to the first wheel of the vehicle.

18. An electronic weigh scale for a vehicle having side by side wheels, comprising:

a. an elongated base for placement on a surface, the base having a planar top with at least a first set of recesses including at least two recesses, and a second set of recesses including at least two recesses;

b. a first set of load cells, the first set of load cells including at least two load cells, each load cell being elongated and having a long axis, a short axis, and a top surface, the load cells being aligned parallel to each other, each load cell being fixedly coupled to the base, and each load cell being disposed over a recess of the first set of recesses, each load cell of the first set of load cells having:

i. first and second, opposing, longitudinal edges, and wherein each longitudinal edge has a plurality of spaced apart notches forming spaced apart lateral members, and wherein the notches and lateral members of the first longitudinal edge being aligned with the notches and lateral member of the second longitudinal edge, and ii. a planar top with at least two raised elements extending from the planar top a predetermined distance, the raised elements being aligned with each other along a long axis of the load cell, each raised element being laterally aligned with and disposed between an opposing pair of lateral members;

c. a second set of load cells, each second set of load cells including at least two load cells, each load cell being elongated and having a long axis, a short axis, and a top surface, the load cells being aligned parallel to each other, each load cell being fixedly coupled to the base, and each load cell being disposed over a recess of the second set of recesses, each load cell of the second set of load cells having:

i. first and second, opposing, longitudinal edges, and wherein each longitudinal edge has a plurality of spaced apart notches forming spaced apart lateral members, and wherein the notches and lateral members of the first longitudinal edge being aligned with the notches and lateral member of the second longitudinal edge, and ii. a planar top with at least two raised elements extending from the planar top a predetermined distance, the raised elements being aligned with each other along a long axis of the load cell, each raised element being laterally aligned with and disposed between an opposing pair of lateral members;

d. wherein the first set of recesses of the base are further aligned with each other below the first set of load cells, and the second set of recesses are further aligned with each other below the second set of load cells;

e. a first platform contacting the top surface of each of the load cells of the first set of load cells, the first platform being fixedly coupled to each load cell, the first platform being adapted to receive a load from a first wheel of a vehicle; and f. a second platform contacting the top surface of each of the load cells of the second set of load cells, the second platform being fixedly coupled to each load cell, the second platform being adapted to receive a load from a second wheel of a vehicle, disposed side by side to the first wheel of the vehicle.

19. A weigh scale, comprising a base for placement on a surface, the base having a planar top surface;

at least one first load cell, the at least one first load cell being elongated and having a long axis, a short axis, and a top surface, the at least one first load cell being fixedly coupled to the base;

at least one second load cell, the at least one second load cell being elongated and having a long axis, a short axis, and a top surface, the at least one second load cell being fixedly coupled to the base;

a first platform contacting the top surface of the at least one first load cell, the first platform being fixedly coupled to the at least one first load cell, the first platform being adapted to receive a load from a first wheel of a vehicle;

a second platform contacting the top surface of the at least one second load cell, the second platform being fixedly coupled to the at least one second load cell, the second platform being adapted to receive a load from a second wheel of a vehicle;

wherein the base planar top has at least one first recess disposed below the at least one first load cell and at least one second recess disposed below the at least one second load cell;

wherein the base is elongated, wherein the at least one first load cell comprises at least two elongated load cells forming a first set of load cells, the at least two load cells of the first set of load cells being aligned parallel to each other and spaced apart from each other under the first platform, and wherein the at least one second load cell comprises at least two elongated load cells forming a second set of load cells, the at least two load cells of the second set of load cells being aligned parallel to each other and spaced apart from each other under the second platform;

wherein there at least two recesses aligned in line with each other below each of the at least two load cells of the first set of load cells; and wherein there are at least two recesses aligned in line with each other with each of the at least two load cells of the first set of load cells.

* * * * *